United States Patent [19]

Young et al.

[11] Patent Number: 5,479,268
[45] Date of Patent: Dec. 26, 1995

[54] USER INTERFACE FOR TELEVISION SCHEDULE SYSTEM

[75] Inventors: Patrick Young, San Mateo; John H. Roop, Palo Alto; Allan R. Ebright, Los Gatos; michael W. Faber, Pleasanton; David Anderson, Mountain View, all of Calif.

[73] Assignee: Starsight Telecast Inc., Fremont, Calif.

[21] Appl. No.: 198,538

[22] Filed: Feb. 18, 1994

Related U.S. Application Data

[63] Continuation of Ser. No. 579,555, Sep. 10, 1990, abandoned.

[51] Int. Cl.⁶ .................................................... H04N 5/76
[52] U.S. Cl. ....................... 358/335; 360/33.1; 348/734; 348/906; 348/13
[58] Field of Search ............................ 358/335, 310; 455/171.1, 186; 360/33.1, 69; 348/734, 906, 578, 6, 13; 345/146; H04N 5/76

[56] References Cited

U.S. PATENT DOCUMENTS

| 3,848,193 | 11/1974 | Martin et al. | 325/53 |
| 3,893,049 | 7/1975 | Bray | 334/15 |
| 4,162,513 | 7/1979 | Beyers et al. | 358/191 |

(List continued on next page.)

FOREIGN PATENT DOCUMENTS

| 0051228A2 | 5/1982 | European Pat. Off. . |
| 0337336A3 | 10/1989 | European Pat. Off. . |
| 2918846A1 | 5/1979 | Germany . |
| 62-008389 | 1/1987 | Japan . |
| 62-066493 | 3/1987 | Japan . |
| 2155713 | 3/1985 | United Kingdom . |
| WO/88/04507 | 6/1988 | WIPO . |
| WO89/03085 | 4/1989 | WIPO . |

OTHER PUBLICATIONS

Gunter Zeisel, P. T., et al.; "An Interactive Menu–Driven Remote Control Unit for TV–Receivers and VC–Recorders"; *IEEE Transactions on Consumer Electronics*, vol. 34, No. 3, pp. 814–818, Aug. 1988.

R. Edmondson and R. Post, "NBC Switching Central", SMPTE Journal, Oct. 1976, vol. 85, No. 10, pp. 795–805.

S. M. Edwardson and A. Gee, "CEEFAX: A Proposed New (List continued on next page.)

*Primary Examiner*—Tommy P. Chin
*Assistant Examiner*—Khoi Truong
*Attorney, Agent, or Firm*—Cooley Godward Castro Huddleson & Tatum

[57] ABSTRACT

Screen (10) for a user interface of a television schedule system and process consists of an array (24) of irregular cells (26), which vary in length, corresponding to different television program lengths of one half hour to one-and-one half hours or more. The array is arranged as three columns (28) of one-half hour in duration, and twelve rows (30) of program listings. Some of the program listings overlap two or more of the columns (28) because of their length. Because of the widely varying length of the cells (26), if a conventional cursor used to select a cell location were to simply step from one cell to another, the result would be abrupt changes in the screen (10) as the cursor moved from a cell (26) of several hours length to an adjacent cell in the same row. An effective way of taming the motion is to assume that behind every array (24) is an underlying array of regular cells. By restricting cursor movements to the regular cells, abrupt screen changes will be avoided. With the cursor (32), the entire cell (26) is 3-D highlighted, using a conventional offset shadow (34). The offset shadow (34) is a black bar that underlines the entire cell and wraps around the right edge of the cell. To tag the underlying position—which defines where the cursor (32) is and thus, where it will move next—portions (36) of the black bar outside the current underlying position are segmented, while the current position is painted solid.

11 Claims, 24 Drawing Sheets

U.S. PATENT DOCUMENTS

| | | | |
|---|---|---|---|
| 4,288,809 | 9/1981 | Yabe | 358/12 |
| 4,325,081 | 4/1982 | Abe et al. | 455/171.1 |
| 4,339,798 | 7/1982 | Hedges et al. | 364/412 |
| 4,347,498 | 8/1982 | Lee et al. | 340/825 |
| 4,422,105 | 12/1983 | Rodesch et al. | 360/72.1 |
| 4,495,654 | 1/1985 | Deiss | 455/151 |
| 4,496,171 | 1/1985 | Cherry | 283/61 |
| 4,620,229 | 10/1986 | Amano et al. | 358/194 |
| 4,641,205 | 2/1987 | Beyers, Jr. | 360/35.1 |
| 4,691,351 | 9/1987 | Hayashi et al. | 380/10 |
| 4,706,121 | 11/1987 | Young | 358/146 |
| 4,739,406 | 4/1988 | Morton et al. | 348/578 |
| 4,751,578 | 6/1988 | Reiter et al. | 358/183 |
| 4,789,962 | 12/1988 | Berry et al. | 345/146 |
| 4,812,940 | 3/1989 | Takenaga | 360/72.1 |
| 4,847,696 | 7/1989 | Matsumoto et al. | 360/33.1 |
| 4,885,775 | 12/1989 | Lucas | 380/10 |
| 4,908,713 | 3/1990 | Levine | 358/335 |
| 4,977,455 | 12/1990 | Young | 358/142 |
| 4,989,104 | 1/1991 | Schulein et al. | 360/72.1 |
| 5,151,789 | 9/1992 | Young | 358/194.1 |

OTHER PUBLICATIONS

Broadcasting Service", SMPTE Journal, Jan. 1974, vol. 83, pp. 14–19.

TV Guide, Feb. 6, 1989, San Francisco Metropolitan Schedule.

Printed materials on "Time's Teletext Service", 1982–83, pp. V79175, V79142, V79143, V79148, and V79151 (Full Copy Hand Carried).

Don Snider Demo Videotope of TVIS System, San Diego & Orlando Broadcast 1983 "Bluelagoon" Screen Shot (V79392) (Hand Carried).

| CH 2 | KNTV-FOX | CBL 2 | 11:25A | TUE APR 3 |
|---|---|---|---|---|
| | 11:00 AM | 11:30 AM | 12:00 PM | |
| 2 | JUDGE(PART 1) | JUDGE(PART 2) | AT NOON | |
| 4 | GOLDEN GIRLS | NEWS | INSIDE EDITION | |
| 5 | YOUNG & RESTLESS 26 | | NEWS 26 | |
| 7 | PERFECT STRA | LOVING | ALL MY CHILD | |
| 9 | SESAME STREET 26 | | | |
| 13 | ALL MY CHILDREN | | NEWS | |
| 44 | EVERYDAY 26 | | MOVIE | |
| A&E | LORNE GREEN'S WORLD OF S | | FUGITIVE | |
| CNN | NEWS | | NEWS | |
| DIS | WALT DISNEY PRESENTS | | LUNCH BOX | |
| LIF | JANE WALLACE | | FRUGAL GOURM | |
| TNT | MOVIE 26 | | | |

FIG.—2

| CH 2 | 11:00 AM | 11:30 AM | 12:00 PM |
|---|---|---|---|
| 2 | JUDGE(PART 1) | JUDGE(PART 2) | AT NOON |
| 4 | GOLDEN GIRLS | NEWS 26 | INSIDE EDITION |
| 5 | YOUNG & RESTLESS | | NEWS 26 |
| 7 | PERFECT STRA | LOVING | ALL MY CHILD |
| 9 | SESAME STREET | | |
| 13 | ALL MY CHILDREN | | NEWS 26 |
| 44 | EVERYDAY 26 | | MOVIE |
| A&E | LORNE GREEN'S WORLD OF S | | FUGITIVE |
| CNN | NEWS | | NEWS |
| DIS | WALT DISNEY PRESENTS | | LUNCH BOX |
| LIF | JANE WALLACE | | FRUGAL GOURM |
| TNT | MOVIE 26 | | |
| CBL 2 | | | |
| KNTV-FOX | | | |

FIG.-3

| PENDING RECORDINGS | RECORDED PROGRAMS | LINKED TITLES | | | ON GRID PROG |
|---|---|---|---|---|---|
| NEWS | | CH 4 | 4/3 | 11:30A | :30 |
| ROSEANNE | | CH 13 | 4/3 | 9:00P | :30 |
| ALL MY CHILDREN | | CH 7 | 4/4 | 12:00P | 1:00 |
| MACNEIL, LEHRER | | CH 9 | 4/4 | 6:30P | 1:00 |
| QUANTUM LEAP | | CH 4 | 4/5 | 10:00P | 1:00 |
| NOVA | | CH 9 | 4/5 | 8:00P | 1:00 |
| MOVIE: ALIEN NATION | | HBO | 4/5 | 9:00P | 2:00 |
| ALL MY CHILDREN | | CH 7 | 4/6 | 12:00P | 1:00 |
| CHEERS | | CH 5 | 4/6 | 7:00P | :30 |
| MOVIE: SUMMER JOB | | SHO | 4/6 | 9:00P | 2:00 |
| NBA BASKETBALL | | CH 5 | 4/7 | 4:00P | ? |
| | | | | SP | EP |

FIG. -4

| | 11:00 AM | 11:30 AM | 12:00 PM |
|---|---|---|---|
| 2 | JUDGE(PART 1) | JUDGE(PART 2) | AT NOON |
| 4 | GOLDEN GIRLS | NEWS 26 | INSIDE EDITION |
| 5 | YOUNG & RESTLESS | | NEWS 26 |
| 7 | PERFECT STRA | LOVING | ALL MY CHILD |
| 9 | SESAME STREET 26 | | |
| 13 | ALL MY CHILDREN | | NEWS 26 |
| 44 | EVERYDAY | | MOVIE |
| A&E | LORNE GREEN'S WORLD OF S | | FUGITIVE |
| CNN | NEWS 26 | | NEWS |
| DIS | WALT DISNEY PRESENTS | | LUNCH BOX |
| LIF | JANE WALLACE | | FRUGAL GOURM |
| TNT | MOVIE 26 | | |

| CH 2 | KNTV-FOX | CBL 2 | 11:25A | TUE APR 3 |

FIG.—5

|      | 11:00 AM | 11:30 AM | 12:00 PM |
|------|----------|----------|----------|
| 2    | JUDGE(PART 1) | JUDGE(PART 2) | AT NOON |
| 4    | GOLDEN GIRLS | NEWS 26 | INSIDE EDITION |
| 5    | YOUNG & RESTLESS | | NEWS 26 |
| 7    | PERFECT STRA | LOVING | ALL MY CHILD |
| 9    | SESAME STREET 26 | | |
| 13   | ALL MY CHILDREN | | NEWS 26 |
| 44   | EVERYDAY 26 | | MOVIE |
| A&E  | LORNE GREEN'S WORLD OF S | | FUGITIVE |
| CNN  | NEWS | | NEWS |
| DIS  | DOROTHY BRINGS SOPHIA'S SISTER (NANCY WALKER) OVER FROM SICILY AS A BIRTHDAY SURPRISE | | |
| LIF  | | | |
| TNT  | | | |
| CH 2 | KNTV-FOX | CBL 2 | 11:25A | TUE APR 3 |

FIG.—6

WHAT'S NEXT ON CHANNEL 2

| | | |
|---|---|---|
| 11:00 A | JUDGE (PART 1) | |
| 11:30 A | JUDGE (PART 2) | |
| 12:00 P | AT NOON | |
| 1:00 P | MOVIE: ANATOMY OF A SEDUCTION | |
| 3:00 P | ALVIN AND THE CHIPMUNKS | |
| 3:30 P | SUPER MARIO BROS. SUPER SHOW | |
| 4:00 P | CHIP'N DALES RESCUE RANGERS | |
| 4:30 P | DUCKTALES | |
| 5:00 P | SILVER SPOONS | |
| 5:30 P | THREE'S COMPANY | |
| 6:00 P | WHO'S THE BOSS | |
| 6:30 P | MAMA'S FAMILY | |
| 7:00 P | CHEERS | |

| CH 2 | KNTV-FOX | CBL 2 | 11:25A | TUE APR 3 |

- MOVIES
- SPORTS
  - THEMES
  - SPECIALS
  - TV FARE
- PROFESSIONAL
- COLLEGIATE — CHAMPIONSHIP
- 112

- ALL SPORTS
- AUTORACING
- BASEBALL
- BASKETBALL
- BOATRACING
- BOWLING
- BOXING
- FOOTBALL
- GOLF
- HORSERACING
- OLYMPICS
- TENNIS
- TRACK/FIELD
- SPORTS ANTHOLOGY
- SPORTS NEWS/COMMENT
- OTHER SPORTS

FIG.—18

CHANNEL CUSTOMIZATION — PAGE 1

| MY | | | |
|---|---|---|---|
| 2 | 2 KTVU-2 | 14 WGN | 26 CSPAN |
| 4 | 3 KICU-36 | 15 PPVW | 27 MAX |
| 5 | 4 KRON-4 | 16 KVOF-38 | 28 CSPAN |
| 7 | 5 KPIX-5 | 17 WTBS | 29 EDUC |
| 9 | 6 KSTS-48 | 18 KCSM-60 | 30 DIS |
| 20 | 7 KGO-7 | 19 KTSF-26 | 31 VH-1 |
| 44 | 8 KTEH-54 | 20 KOFY-20 | 32 SHO |
| HBO | 9 KQED-9 | 21 TRVL | 33 CNN |
| SHO | 10 KDTV-14 | 22 CBN | 34 ESPN |
| CNN | 11 KNTV-11 | 23 CBB | 35 LIF |
| DIS | 12 KBHK-44 | 24 BDSS | 36 HBO |
| ESPN | 13 KQEC-32 | 25 BARC | 37 GALA |

USE SELECT TO CHANGE STATUS:   MY   OFF   ON

FIG.-20

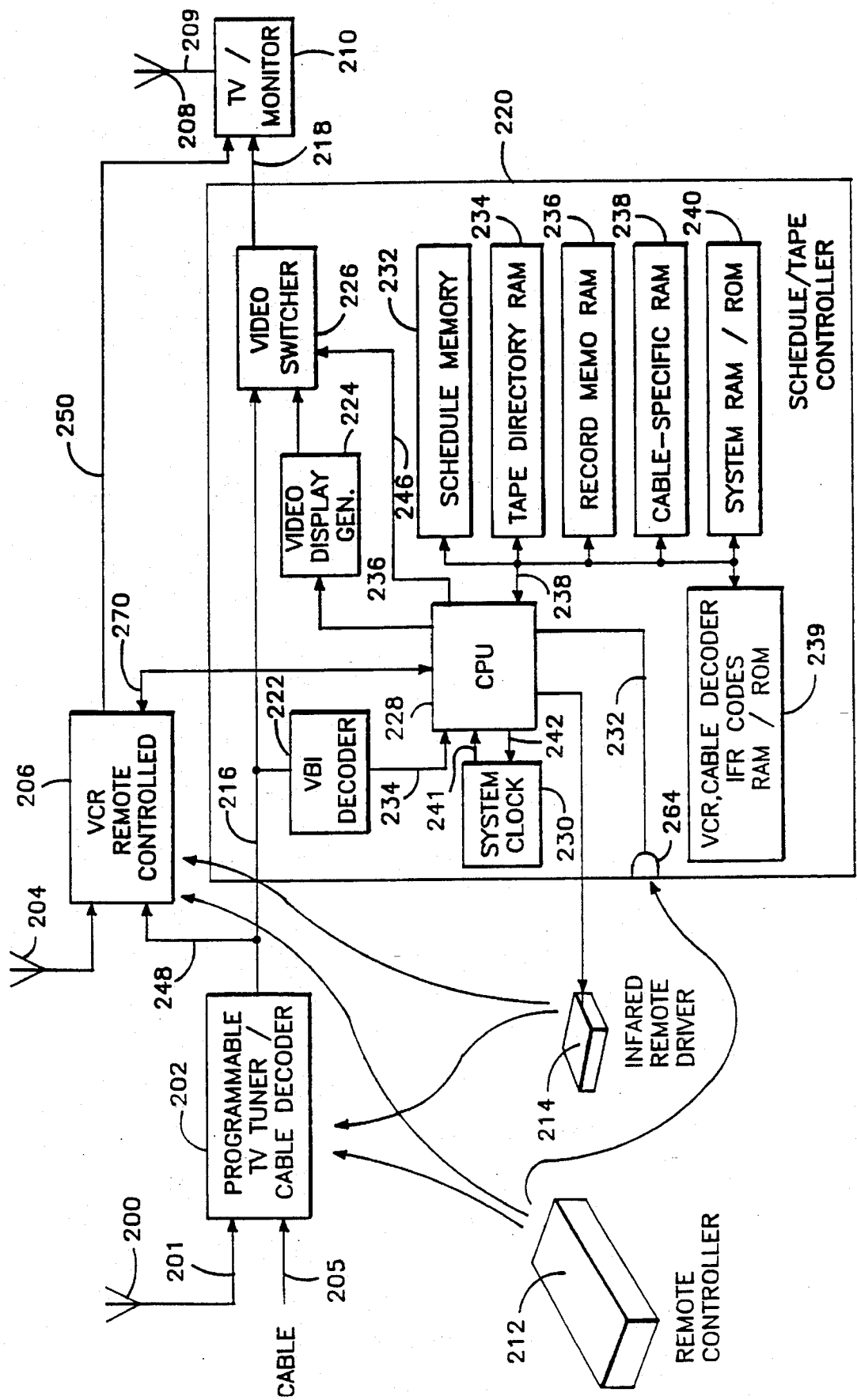
FIG.—22A

| PENDING RECORDINGS | RECORDED PROGRAMS | LINKED TITLES | ON GRID PROG |
|---|---|---|---|
| ROOTS | | | |
| LUCY | CH 44 8:00 P | | |
| 49ER'S FOOTBALL | | | |
| TWIN PEAKS | | | |
| U.S. OPEN GOLF | | | |
| LUCY (TWO) | CH 36 4:30 P SUSPENDED | | |

TO CANCEL SELECTION, USE CANCEL/UNDO
TO SUSPEND SELECTION, USE SELECT

FIG.–23

USER INTERFACE FOR TELEVISION SCHEDULE SYSTEM

CROSS REFERENCE TO RELATED APPLICATIONS

This application is a File Wrapper Continuation of U.S. application Ser. No. 07/579,555, filed Sep. 10, 1990, now abandoned.

BACKGROUND OF THE INVENTION

1. Field of the Invention

The present invention relates generally to a system and process that allows a television viewer to access on screen television program listings and use the program listings in an easy and convenient way to control operation of a video cassette recorder (VCR) or other recording device. In addition, it relates to such a system and process that creates a directory of recorded programs by title for easy retrieval and program playback. More particularly, it relates to such a system and process in which the VCR or other recording device is controlled by a simple selection of program title and a record command, even for recording at a future date and time. Most especially, it relates to such a system and process incorporating an intuitive user interface.

2. Description of the Prior Art

The difficulty of setting a VCR for automatic recording at a future date is notorious. Even users who are technically sophisticated will often make mistakes in the VCR programming procedure that cause them to record the wrong program or not to record anything at all. This difficulty has even resulted in a substantial body of humor dedicated to the subject of programming VCRs.

The difficulty of VCR programming has been alleviated somewhat by the development of VCRs that use a television set as a display for user prompts and feedback to the user during the programming process. U.S. Pat. No. 4,908,713, issued Mar. 13, 1990 to Michael R. Levine, discloses such a VCR using the television set as a display for VCR programming with an interactive user interface for directing the user on a step-by-step basis. Such a user interface removes a great deal of the mystery from VCR programming, but users still have difficulty with such a command-based interface and encounter problems carrying out the programming without making mistakes that cause them to miss recording programs they would like to watch at a different time than when they are broadcast.

Commonly assigned U.S. Pat. No. 4,706,121, issued Nov. 10, 1987 to Patrick Young, discloses a system and process in which user selections from television schedule information are used for automatic control of a VCR. That patent also contains a description of a proposed user interface for such a system and process. However, the provision of a highly intuitive user interface that makes such a system and process easy and convenient to operate is a difficult task. Further development of this system and process has produced considerable change in the user interface as originally proposed.

In addition to simplifying VCR programming, users who do a substantial amount of program taping also need an improved system and process for keeping track of their recorded programs. Commonly assigned application Ser. No. 07/219,971, filed Jul. 15, 1988, in the name of Patrick Young, now U.S. Pat. No. 4,977,455, discloses a system and process that provides indexing capability for taped material. A user interface for a television schedule system and process should also handle this capability on an intuitive basis.

Thus, while the art pertaining to the control of VCRs and to television schedule systems is a well-developed one, a need still remains for a television schedule system and process incorporating an improved user interface. In particular, unlike most computer menus, a grid TV guide is an array of irregular cells, where the cell size can vary from a fraction of an hour to many hours—extending well beyond the current screen. If this array is navigated by a cursor that goes from cell to cell, a single cursor command can produce violent screen changes. For example, a cursor right command may cause an abrupt Jump to a cell situated several hours from the current page. Not only is this unsettling, but may take considerable effort to recover. Clearly, a gentler cursor motion is needed for the irregular cells found in a grid TV guide.

Printed grid television schedule guides often include additional information besides the program title and broadcast names. Such grids are also typically provided in combination with a more detailed printed schedule that contains a synopsis of each program, whether the program is a repeat, ratings for movies, and other information. When using a television set as a display for a schedule system, the size and resolution of the television display limit the amount of text that can be displayed with the grid. Improved techniques are required for conveying the most amount of information to the user in an easily understood manner within the limitations of the television display. When a large number of channels are available for viewing, there is also a need to order the display of information most conveniently for the user.

SUMMARY OF THE INVENTION

Accordingly, it is an object of this invention to provide a television schedule system and process with a user interface that is configured to compensate for the particular nature of the television schedule information.

It is a further object of the invention to provide such a user interface having a cursor operation that compensates for an irregular grid format of the television schedule information.

It is another object of the invention to provide such a user interface in which the schedule information is presented in a format that compensates for limited resolution of the television display.

It is still another object of the invention to provide such a user interface in which supplemental schedule information is presented in overlays that obscure a minimum amount of useful other information.

It is a still further object of the invention to provide such a user interface in which order of presentation of the schedule information is customizable by user preference.

The attainment of these and related objects may be achieved through use of the novel television schedule system and process user interface herein disclosed. A television schedule system including a user interface in accordance with this invention has a display. A means is connected to the display for displaying the television schedule on the display as an array of irregular cells which vary dimensionally in length, corresponding to different television program time lengths. A means is connected to the display for providing a cursor with the television schedule on the display. The cursor has a variable length corresponding to the length of a selected one of the irregular cells in which the cursor is located. A means is connected to the means for providing the cursor for moving the cursor in the array in a series of equal length steps. At least some of the irregular cells have a length which is greater than the length of the steps.

In the process of operating a television schedule system with the user interface of this invention, the television schedule is displayed as an array of irregular cells which vary dimensionally in length, corresponding to different television program time lengths. A cursor is provided with the television schedule on the display, the cursor has a variable length corresponding to the length of a selected one of the irregular cells in which the cursor is located. The cursor is moved in the array in a series of equal length steps, with at least some of the irregular cells having a length which is greater than the length of the steps.

In another aspect of the invention, a control system for a video recording machine has a controller for starting and stopping the video recording machine, for recording video information on recording media, and for playing recorded video information on recording media. A display generator provides display image generation signals. A means supplies information to the display generator for generation of display images relating to operation of the video recording machine. The means for supplying information includes means for generating a recording media position indicator graduated as segments corresponding to programs recorded on the recording media.

In a process for controlling a video recording machine, a recording media position indicator is graduated as segments corresponding to programs recorded on the recording media. The recording media position indicator is displayed as position of a selected one of the recording media in the video recording machine is changed.

In a further aspect of the invention, a television schedule system includes a display and means connected to the display for displaying the television schedule on the display. The means for displaying a schedule is configured to allow selection by a user of a first number of desired channels for display of schedule information which is less than a second number of available channels. A programmable tuner is connected to the means for displaying a schedule. The programmable tuner is configured to follow the first number of desired channels when the television schedule is shown on the display in response to a channel up or channel down command. The programmable tuner is configured to follow the second number of available channels in the absence of the television schedule on the display in response to a channel up or channel down command.

In a process for operating a television schedule system, a first number of desired channels is selected for display of schedule information, which is less than a second number of available channels. The schedule information is displayed on a display. The first number of desired channels is followed when the schedule information is shown on the display in response to a channel up or channel down command. The second number of available channels is followed in the absence of the television schedule on the display in response to a channel up or channel down command.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIGS. 1–3 are diagrammatic representations of a television schedule grid incorporating the user interface for the system and process of this invention.

FIG. 4 is a diagrammatic representation of a screen display used in the system and process of the invention.

FIGS. 5–7 are additional diagrammatic representations of the television schedule grid incorporating the user interface for the system and process of the invention.

FIG. 14–17 are diagrammatic representations of program selection by category screen displays of the user interface for the system and process of the invention.

FIG. 20 is a diagrammatic representation of a channel customization screen display of the user interface for the system and process of the invention.

DETAILED DESCRIPTION OF THE INVENTION

Figure 1:
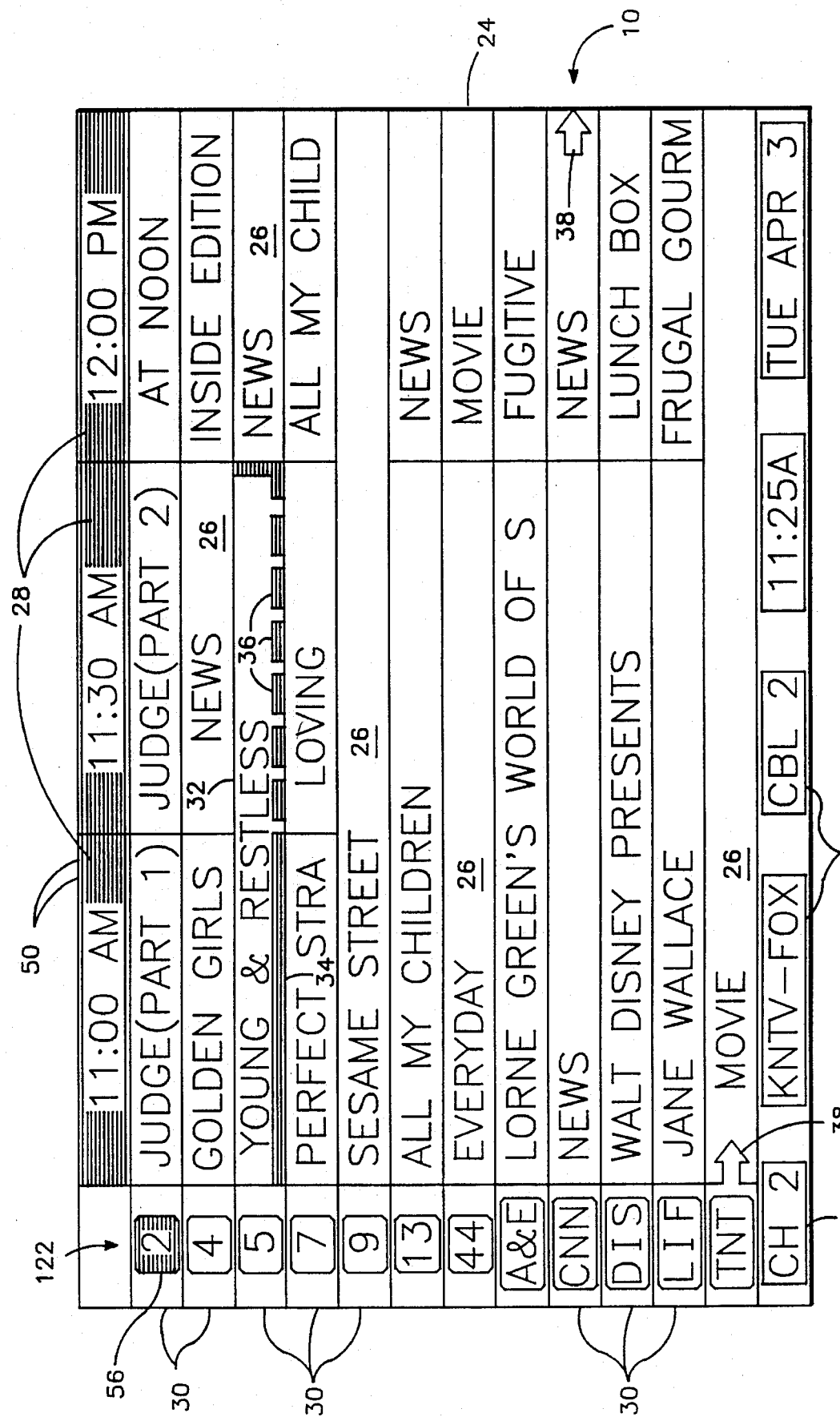

Turning now to the drawings, more particularly to FIGS. 1–7, there are shown a series of menu screens 10, 12, 14, 16, 18, 20 and 22 used in operation of the system and carrying out the process of the invention. Screens 10, 12, 14, 18 and 20 each consists of an array 24 of irregular cells 26, which vary in length, corresponding to different television program lengths of one half hour to one-and-one half hours or more. The array is arranged as three columns 28 of one-half hour in duration, and twelve rows 30 of program listings. Some of the program listings overlap two or more of the columns 28 because of their length. Because of the widely varying length of the cells 26, if a conventional cursor used to select a cell location were to simply step from one cell to another, the result would be abrupt changes in the screens 10, 12, 14, 18 and 20 as the cursor moved from a cell 26 of several hours length to an adjacent cell in the same row. Such abrupt changes disorient a user of the system.

An effective way of taming the motion is to assume that behind every array 24 is an underlying array of regular cells. By restricting cursor movements to the regular cells, abrupt screen changes will be avoided. However, there is now a potential ambiguity between the underlying cell which governs cursor movement and a visible cell 26 which holds the program title.

Viz.: if the cursor moves in half hour steps, and the cell length is, say four hours, should the cursor be ½ hour long or four hours long? If the cursor only spans the interval of the underlying cell (½ hour), the cursor appears to be highlighting a segment of the cell, which is misleading. On the other hand, if the cursor spans the entire four hours of the TV listing, the cursor underlying position will be obscure. In this case, cursor right/left commands will appear inoperative while traversing a long cell. The absence of feedback following a cursor command is befuddling to users. Therefore, an innovative cursor 32 (FIG. 1) for the irregular array 24 is required which satisfies several conflicting requirements.

With the cursor 32, the entire cell 26 is 3-D highlighted, using a conventional offset shadow 34. The offset shadow 34 is a black bar that underlines the entire cell and wraps around the right edge of the cell. To tag the underlying position— which defines where the cursor 32 is and thus, where it will move next—portions 36 of the black bar outside the current underlying position are segmented, while the current position is painted solid.

For an half hour cell 26, the offset shadow's underline bar will always be solid black. FIGS. 2 and 3 show the cursor 32 as it appears for a half-hour program. For programs that go beyond ½ hour, only the current ½ hour position will be solid black. All remaining positions will be striped. If the cursor is moved left or right, the solid section will move accordingly, providing complete visual feedback. Thus, this modified 3D offset shadow cursor 32 satisfies the demands stated above: it spans the entire cell, yet clearly highlights the current underlying position. Movement of the cursor 32 will always be visible even for cells 26 that are much longer than the underlying cell.

A grid continuity icon 38 is shown in FIG. 1. Printed grid television schedule guides often include parenthetical comments, (such as "cont'd") to indicate program continuity. In an electronic guide displayed on a TV screen, limited text space precludes parenthetical comments. To conserve space; an icon 38 will be used to indicate cell 26 continuity. At the border of a cell 26 that is continued to the next screen, an arrow icon 38 pointing to the right will be overlaid. The arrow direction always points to right, which is the direction of program elapse.

FIGS. 2 and 3 show recording status representations. When a program has been selected for recording, its listing cell 26 will be outlined or highlighted in red, as indicated at 40. If guard time has been added or deleted, the cell will be stretched or shrunk to reflect the change. Cell 26 continuity will be treated the same as above. There are four other record status representations:

- If the cell is actively being recorded, the outline 40 will blink off and on.
- A recorded cell will be displayed with a solid red background 42 (Note: Not shown in drawing).
- A mis-recorded cell will be indicated by red hash-marks 44 over the title. A mis-recording can be the result of insufficient tape, VCR loss of power, stopped before completion, etc.
- A program linking icon 46 is shown in FIG. 5.

After each schedule update, the schedule system examines the new listings for the occurrence of any titles that match a title in Linked Titles (FIG. 23). If a title matches, it will automatically be tagged for recording. When a linked program is displayed in the guide, it will have two identifiers: a red outline 40 indicating that the title has been selected for recording, and a link icon 46 appended to the title to indicate that this title was link-selected. After a linked program has been recorded, it will be treated like any recorded program with the title shaded in red. To differentiate this recording from others, the link icon will remain appended to the title.

Further details on the linking feature are given in screen 19 of FIG. 23. 1) A linked program 47 may be suspended by the user (perhaps to avoid conflict with a pending recording), by de-selecting the link title in the Link List screen, under the Record Memo command. A suspended link program will still be identified by a link icon, but the red-outline will be suppressed since the program will not be recorded. 2) A smart link process is used to tame the matching of titles when there is a likelihood of excessive candidates for recording. The Lucy show, for example, is often syndicated on several channels. Untamed linking of Lucy may result in a plethora of recordings. For such series, the link list will include the channel and time as well as the link title. For the avid Lucy-phile, the user can locate each series individually for linking. If there is more than one link title of the same name, the series will be numbered, in the order of acquisition. Thus, the second Lucy will be identified as Lucy (Two), at 47.

FIGS. 1–3 show the columns 28 headed by half-hour header status indicators. The ½ hour header strip across the top of the grid TV guide has two auxiliary functions: 1) as an indicator 48 of pending or in-progress recording scheduled at that time, and 2) as a time-bar 50 to delineate the past from the future. The past is darkened, while the future is lightly shaded. If there is an in-progress recording, the ½ hour header will be red-outlined at 48 in the same manner as a pending recording title cell 26.

FIG. 6 shows a television schedule grid screen 20 with a program note overlay 52. With limited text capacity on TV displays, it is preferable to display as many lines of TV listings as feasible. To handle program notes, which are text intensive, on-demand overlays 52 are used. Program note overlays 52 may include any or all of the following information:

A program genre
Program description
Stars and personalities
Year of release
Episodic subtitles
Run-time of program
Elapse time of the program
Critique (Star Ratings)
Rating (PG, G, etc.)
Call letter, channel markers
Closed caption, stereo.

Program notes for a selected program are overlaid over the grid guide upon request. The program note can be toggled off/on using a SELECT command. The program note 52 overlays and hides 3 or 4 listings of a guide. To minimize concealment of the guide, an auto-roving note is used. The program note will overlay either the top half or bottom half of the screen, as necessary to avoid masking the title of the selected listing. If the cursor 32 is in the upper half of the screen, the note will appear in the bottom half, and vice versa. If the cursor 32 is moved to the lower half of the screen, the note will automatically position itself in the upper half of the screen.

FIGS. 1–3 and 5–6 show a channel column 54 in the television schedule grid 24. Favorite stations and cable channels may be listed together to create a personalized grid guide. The channel column 54, unlike most printed TV guides, has a mix of over-the-air station names and cable services names.

The grid 24 guide lists channels by favorite combinations of station number and cable names, and not in the usual numerical order. When viewing the grid 24 guide, a Tuner Up/Down channel command will be mapped according to the channels and order listed on the screen. When not viewing the guide, the tuner sequence will revert back to the usual numerical order. When the last channel on a page is reached, the next Tuner command will change the channel to the channel listed at the beginning of the following page.

When a channel to which the tuner is tuned is displayed on the grid 24, it is highlighted, as shown at 56. A grid 24 page may be changed by either a page command or by entering a channel Up/Dn command as described above. If a page is turned using the page command, the current channel is now located in the previous page, and will not be seen in the new page. Therefore, the new page must suppress the highlighting of a channel, since that indicates the current channel. Note that information about the current channel will still be presented in the channel information boxes 58 at the bottom of the screen.

When is the highlighting re-enabled? Once into the new page, the first channel up/down command will cause the tuner to automatically change to the channel listed in the last or first row 30 respectively of the new page. Since the tuner channel is now located on the new page, the current channel will be highlighted again.

If the channel highlighting is not suppressed after a page is selected, by definition, the tuner must be changed to track the highlighted channel. This is undesirable since casual paging should not cause the channel to change.

When a guide is first opened, as shown in FIG. 2, both the cursor 32 and the current channel 56 are situated on the same row 30 of the grid 24. When the channel 56 is changed, it is desirable to drag the cursor 32 along with the channel in unison. In doing so, the cursor 32 will be ready for a Select command (to retrieve the program note) or for a Record It command. Cursor dragging by the channel command takes place whenever the channel 56 and cursor 32 are united on the same row. If they are not united, the cursor 32 is disengaged from the channel command. Note that dragging is not reciprocal; moving the cursor 32 does not affect channel selection.

FIG. 7 shows a screen 22, showing a program list 58 for a single channel, generated by toggling a user What's On TV command, which switches between the grid 24 and the list 58. The list 58 consists of rows 60 of sequential program listings on the channel and a channel information field 62. Program notes are overlaid on the list 58 in the same manner as shown in FIG. 6 for the grid 24.

Figure 8:
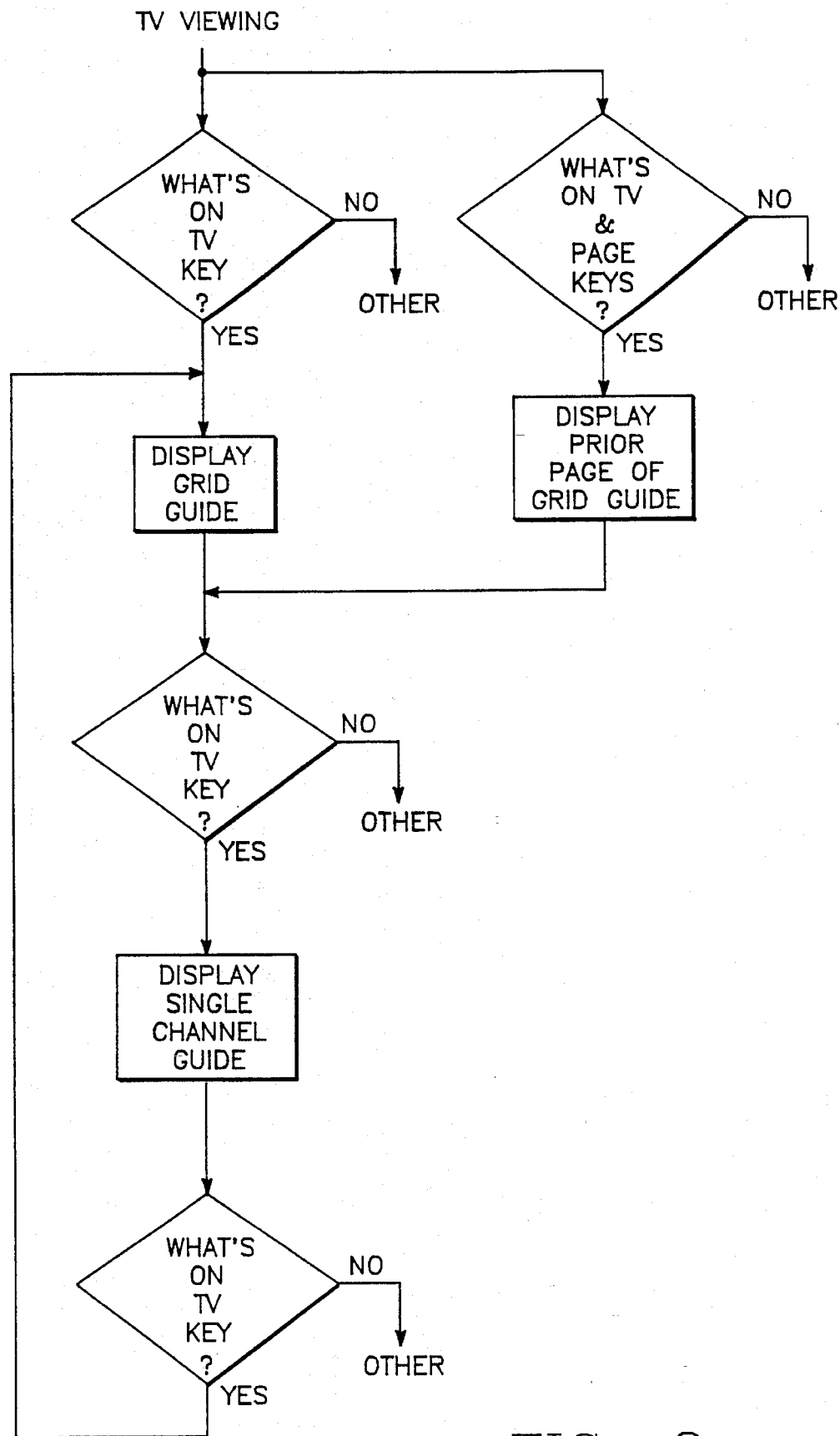
FIG. 8 is a flow chart for understanding the operation of the FIG. 7 diagram.

Each What's On TV command alternates between the grid guide 24 and the What's Next on Channel row guide 58. While viewing the grid guide 24, the next What's On TV command will replace the grid guide 24 with a single-channel row guide 58. FIG. 8 is the flow diagram for the What's On TV command.

The page relationship between the two guides 24 and 58 are tightly coupled. The single channel guide will open to the channel and schedule time that was selected by the cursor 32 on the grid 24. While viewing the single channel guide 58, the Up/Down channel command may be used to change the channel to be listed. When exiting the single channel guide 58 and returning to the grid guide 24, the grid cursor 32 will be pointed to the channel and schedule time last selected on the single channel guide 58.

Figure 9:
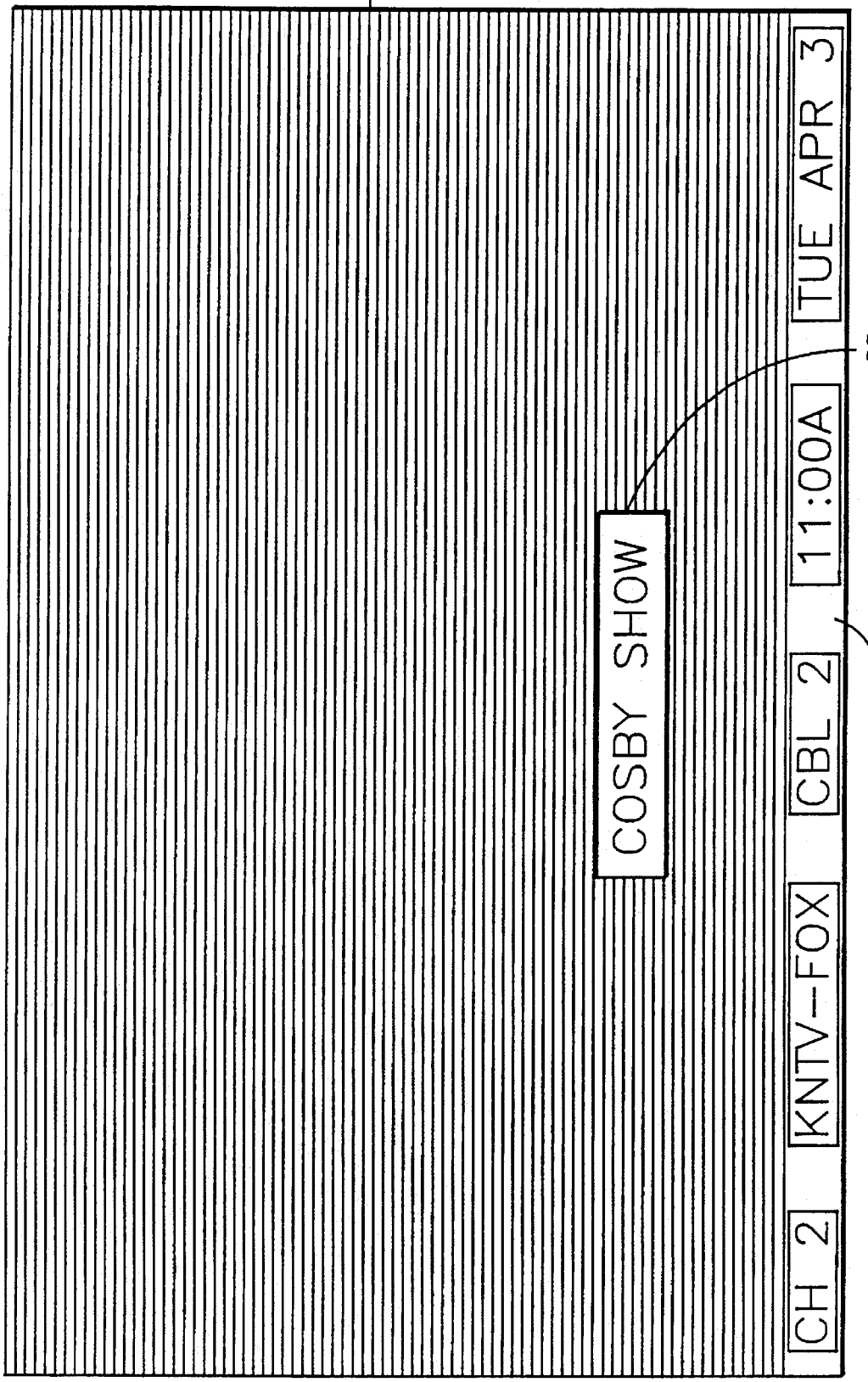
FIGS. 9–10 are additional diagrammatic representations of screen displays of the user interface for the system and process of the invention.
Figure 10:
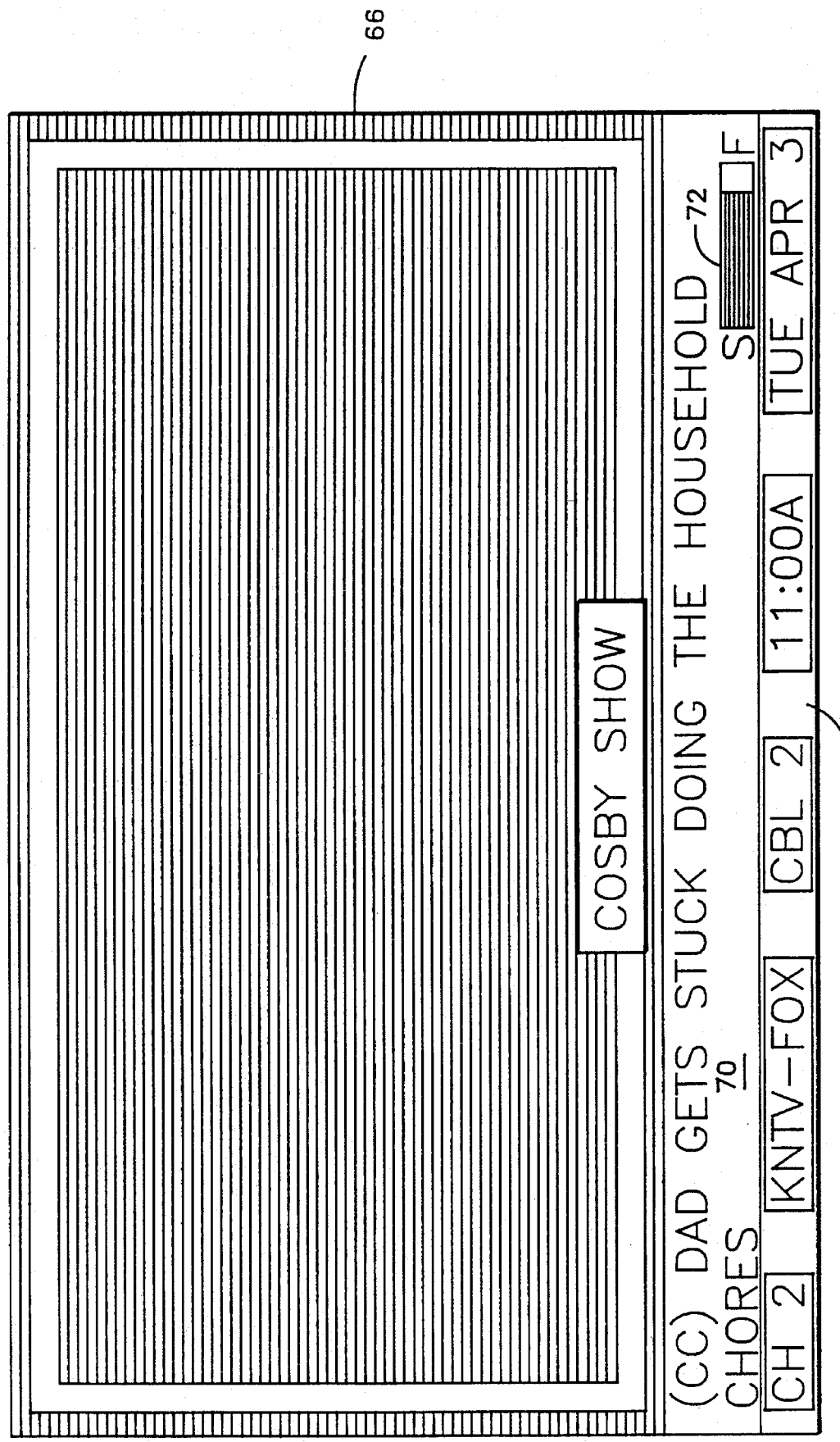
Figure 11:
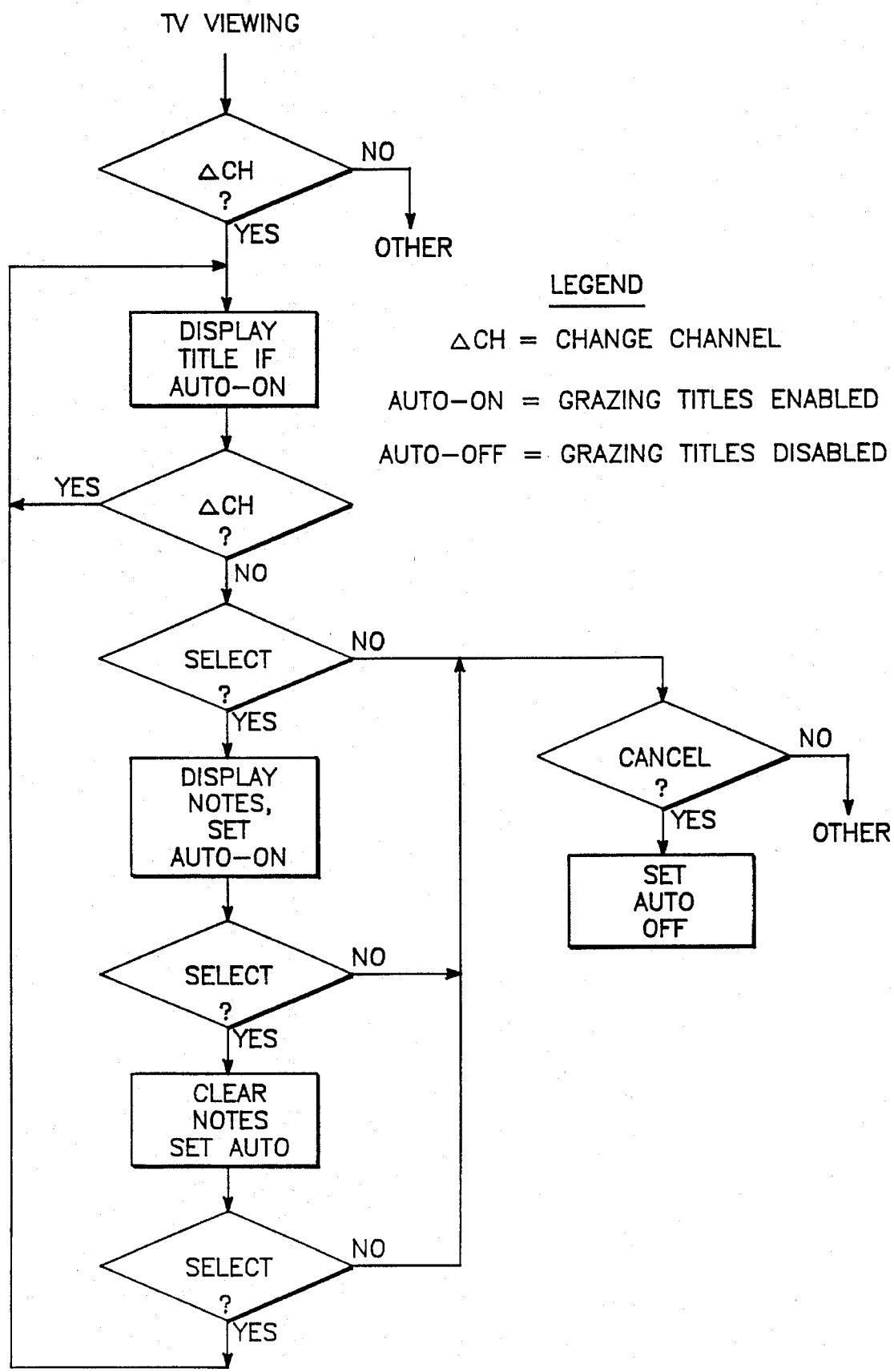
FIG. 11 is a flow chart for understanding the operation of the FIGS. 9–10 diagrams.

FIGS. 9 and 10 show channel grazing overlays 64 and 66 that provide information on current programs when switching channels while watching television. In the overlay 64, when scanning channels, the title of each program is overlaid at 68, along with the name of the TV service (HBO, ABC etc.), the cable channel number, and the current date, day of week, and time in the channel information field 62. The overlay 66 is the same as the overlay 64 except that this overlay includes a program note 70, which is similar to the program note 52 in FIG. 6, but contains information pertinent to a program currently being broadcast on the selected channel. To access program notes, press the Select key. In addition to the program note 70, elapsed time is indicated by a percentage calibrated time bar 72. The bar is bracketed by S for start, and F for finish. By default, titles will appear automatically when channels are scanned. Grazing Titles may be de-activated using the CANCEL key. To restore auto-titles, press Select while viewing TV. The flow diagram governing titles/program notes, while viewing TV, is shown in FIG. 11.

Figure 12:
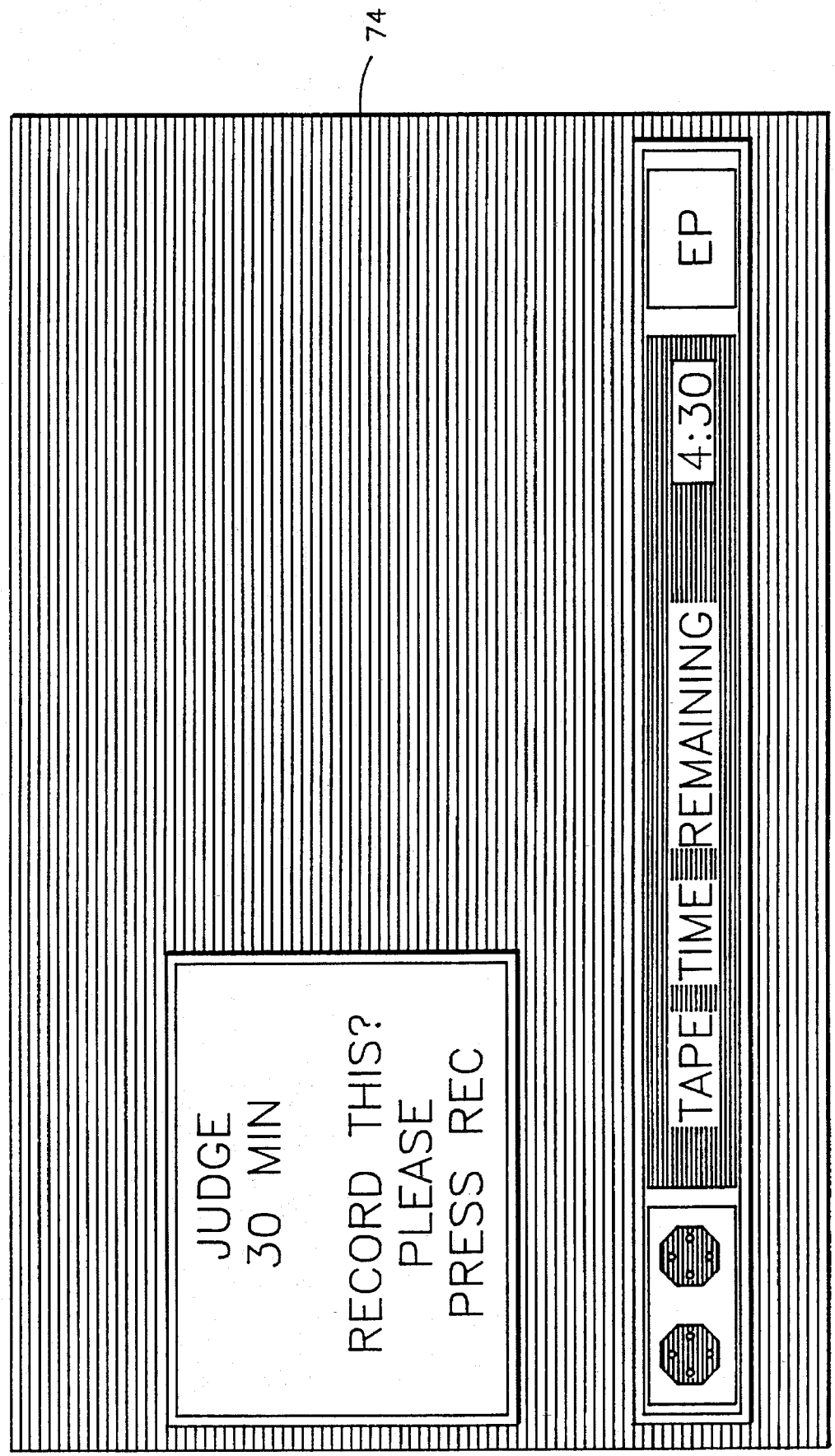
FIGS. 12–13 are diagrammatic representations of taping and tape index screen displays of the user interface for the system and process of the invention.

An express recording screen 74 is shown in FIG. 12. The express recording screen includes the following information:
Title of Program
Length of Program
Tape Time Remaining
Recording Speed.

Figure 13:
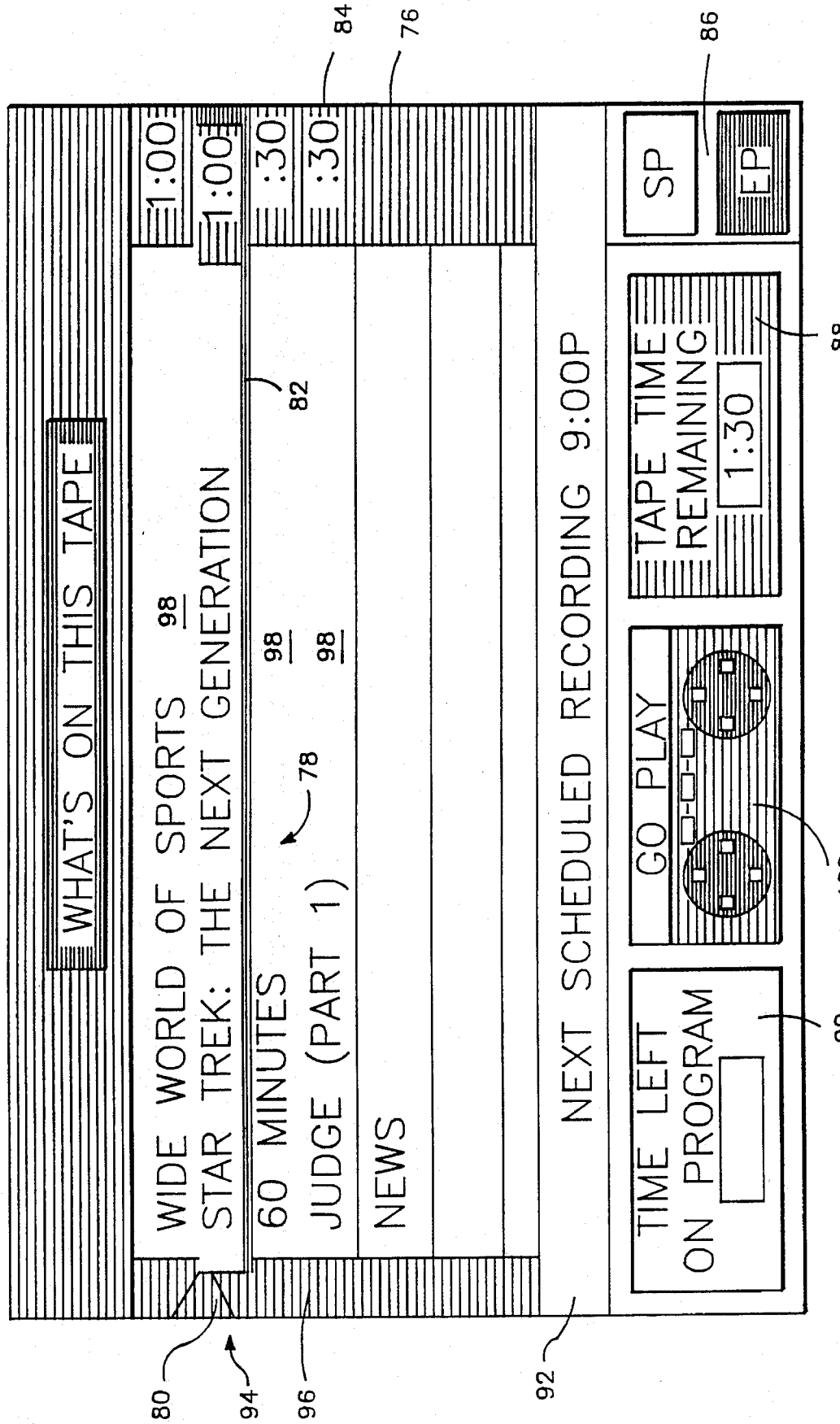
Figure 14:
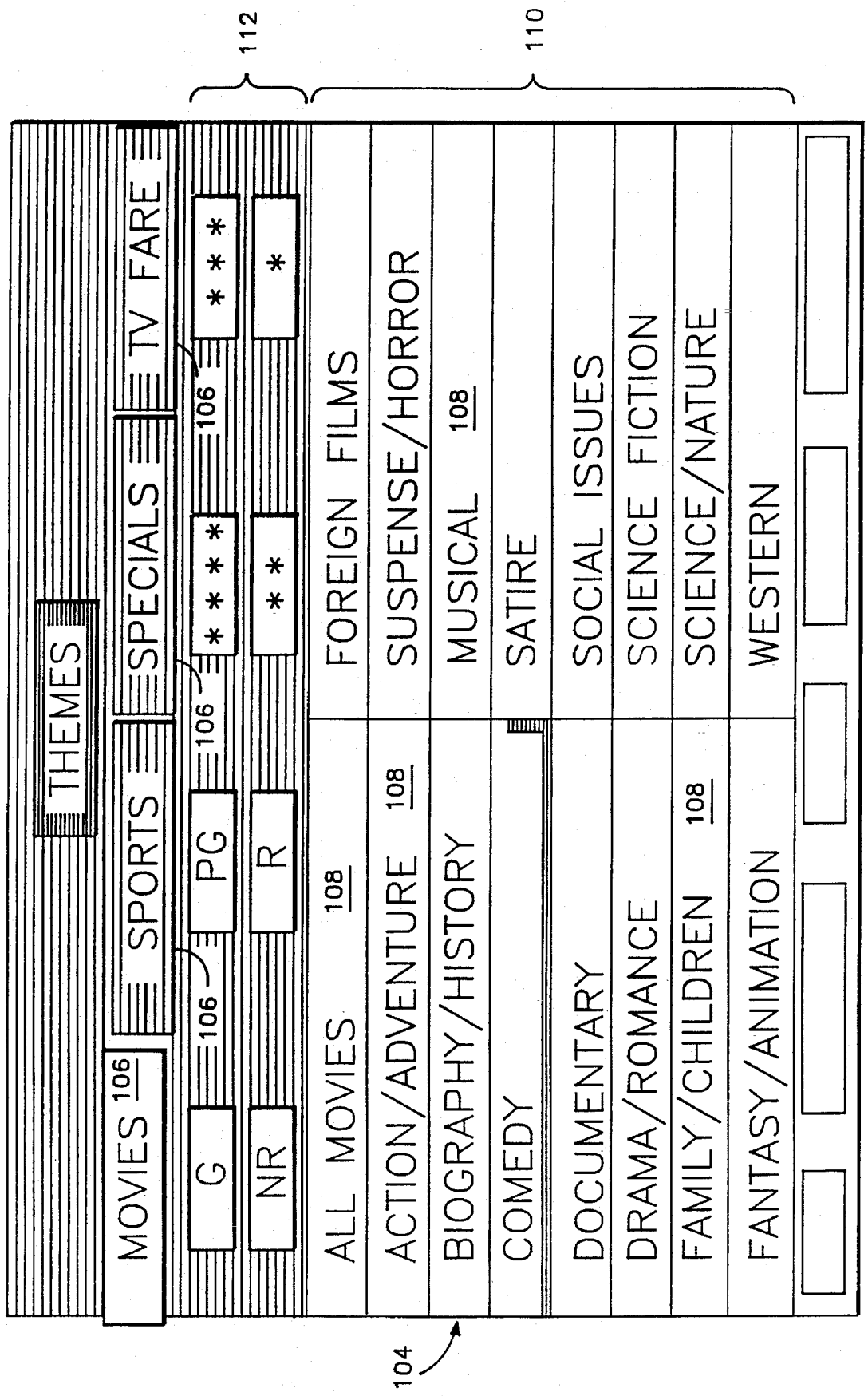
Figure 16:
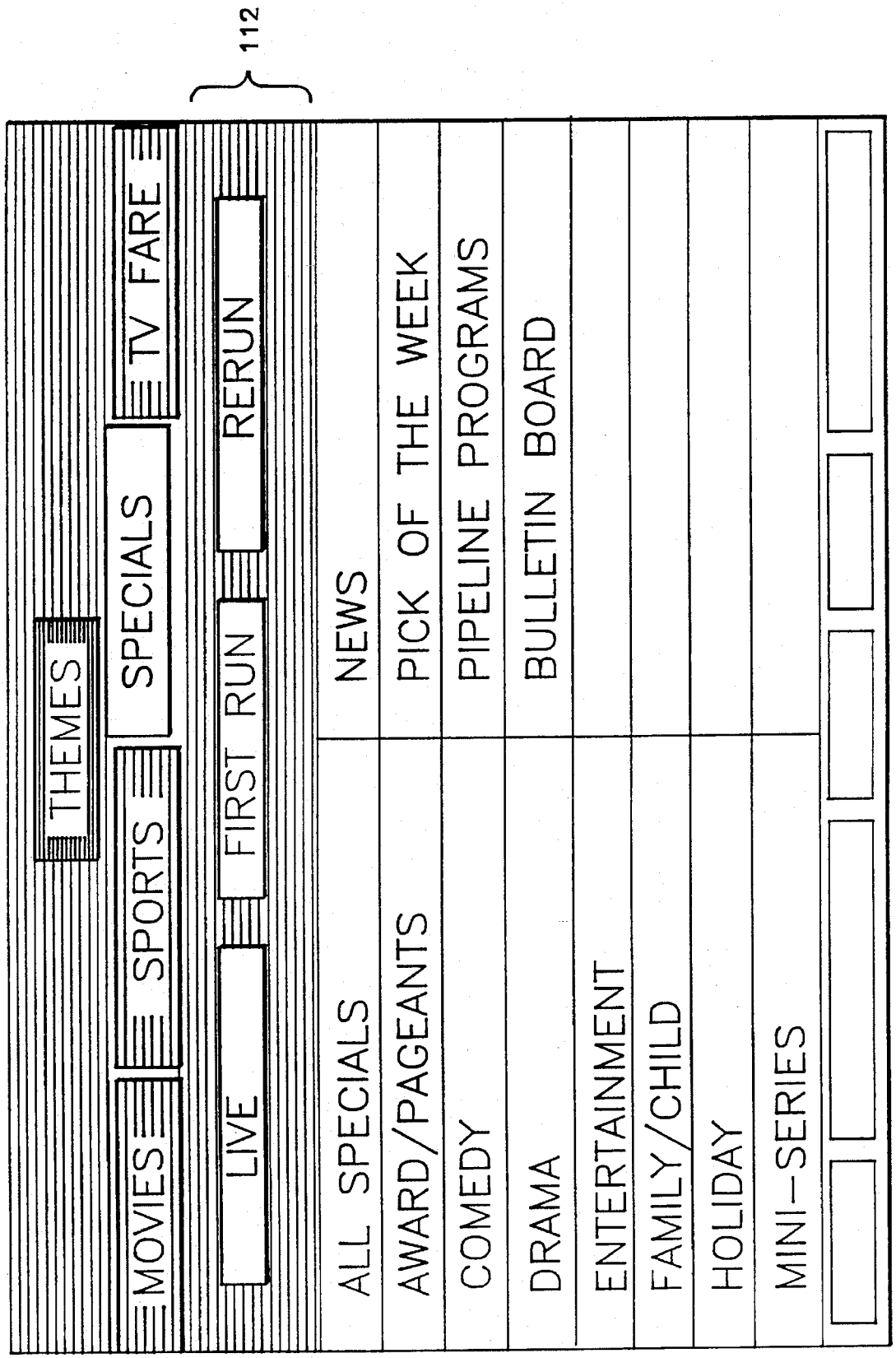
Figure 17:
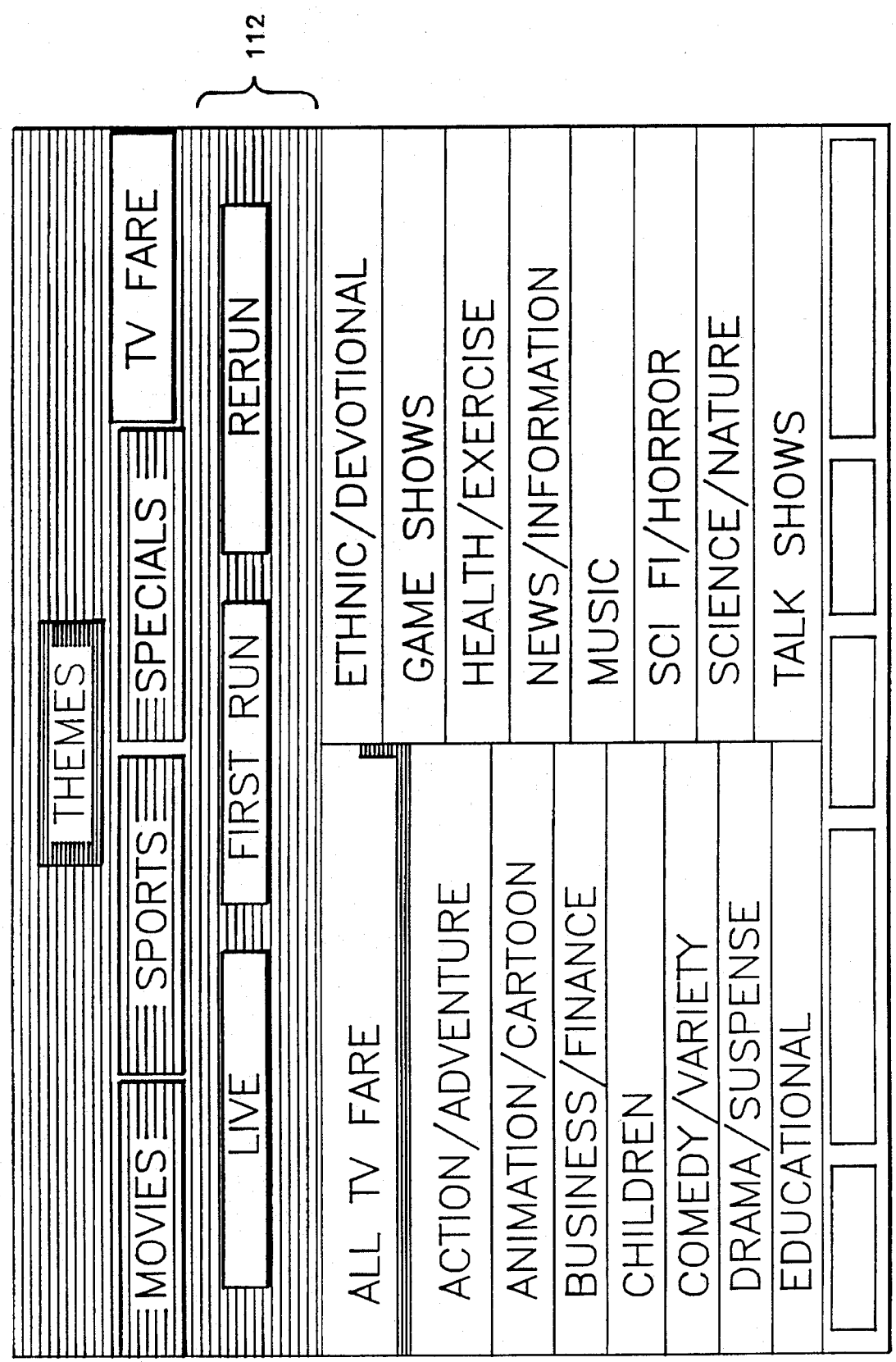

FIG. 13 shows a tape index screen 76. Locating a recorded segment is often an arduous task when several programs have been recorded on the tape. Without a table of contents, the VCR users muddle through stretches of recording trying to find what's recorded on the tape, where the beginning of the desired program is, and where the tape is now. Some premium VCRs provide tape indexing that automatically finds the start of each recording. However, while the viewer can find the start of a recording, the indexing VCRs do not record titles. The net result is about as useful as a having a table of contents without chapter titles. Considerable searching is still required to find what is recorded at each index.

The tape index screen 76 provides a virtual tape directory, giving the equivalent function of a table of contents for a tape recording. There is a list 78 of titles of recorded programs, a pointer 80 to the start of the program, and a current position indicator cursor 82 showing the "chapter" location on the tape. The virtual directory is automatically compiled, revised and stored in off-tape memory as the user records over the tape.

The What's on Tape command will display a list of titles of programs recorded on the tape. The title of the selected program (the segment of tape that is positioned over tape head) is highlighted by the cursor 82. The tape position pointer 80 dynamically tracks the current tape position. All searching is done simply by title, bypassing the need for index numbers. The tape directory is equivalent to a table of contents showing titles, but not page number. It automatically opens to the starting page by simply pointing to the title of the program. In addition to the tape directory 78 of recorded programs, the screen 76 includes a program duration field 84, a recorded speed of each title field 86, a remaining time left on tape field 88, a remaining time left on program field 90 and a next scheduled recording time field 92.

The virtual tape directory is generated as follows. It is difficult to implement a competent self-contained tape directory for a non-random access storage such as a video tape. No matter where the directory is stored on the tape, the latent access time to locate the directory and return to current position (for a standard six hour tape) is excruciating slow, in the order of 6 to 10 minutes.

If redundant directories are recorded uniformly across the tape to minimize latency time, the problem of sluggishness is merely shifted from playback to updating the multiple directories. After each video program is recorded, the entire tape must be scanned to update each directory. Even if this update process is automated, there is a question of excessive wear on tapes and the VCR itself. Viz: each recording, no matter how short, results in high-speed scanning of the entire tape in order to revise all directories.

Even more troubling is the question of when to perform the update, since there is no "safe" period for the VCR to take control. For example, the user may have stopped the tape momentarily, perhaps to skip commercials, only to find that the VCR has commandeered control and placed the tape in a high speed update mode. The safest update is one that is user-initiated. Unfortunately, few VCR users will follow a regimented procedure of updating after each recording session. Clearly, an on-tape directory based on existing technology is not satisfactory.

The following innovative solution, the "virtual tape directory", stores directory information in off-tape memory and does not require an on-tape directory or any augmentation of the video cassette. Since the directory is held in external memory instead of the tape, it is best suited for tapes that have recently been played and recorded, the "working tapes".

When a program is recorded, the title of the program is written to the data (control track) channel of the tape and, at the same time stored in a non-volatile (NV) memory. Other information about the recorded program, such as length of program, theme category, date recorded, and tape identifier code may be written to the data channel, as well as stored in the NV memory. The NV memory is adequate to support a number of working tapes.

When a tape is first loaded, the tape data channel will be scanned for a few seconds to identify the recorded program under the tape head. This data will be matched against the directories stored in NV memory. If there is a match, the directory of the working tape will be displayed immediately when the What's On Tape key is pressed. The "virtual" tape directory appears to have been read from the tape, but is actually obtained from NV memory.

If there is no match, a new directory for the tape will be created. During playback and recording of this tape, a virtual directory will be generated for that tape. Directories of inactive tapes will be automatically purged from memory as new working tapes are introduced.

It is relatively easy to estimate remaining time of a scheduled televised program with the assist of a clock and a TV schedule. In contrast, there are few clues as to current location during playback of a recorded program, particularly when there are several recorded segments on a tape. Tape index counters or running-time clocks require diligent bookkeeping before the start of a recorded segment. Few consumers will tinker with 5 or 6 digit numbers when a "ballpark" indicator is adequate, such as, "is the program about over?", or "about when does the next segment start?". Clearly, there is need to provide a location indicator without the burden of bookkeeping.

To provide an at-a-glance indicator of relative tape location, an on-screen tape position gauge 94 has been devised. The tape position gauge 94 consists of a vertical bar 96 with the arrow pointer 80 located on the left edge of the screen 76. The arrow 80 dynamically tracks the current tape position as the tape is advanced or rewound.

The gauge 94 is graduated, not in linear units, but in units of recorded segments 98 with each segment labelled with its program title. Thus, a 10 minute program or a 6 hour program is represented as one vertical unit corresponding to the width of a segment 98. However, the gauge 94 is linear within each segment 98. If the arrow is pointing at the upper 25% of the program segment 98, it indicates that the tape head is positioned over the first 25% of the program. If a conventional linear gauge were displayed, a far more complicated gauge would be required, that would likely confuse rather than clarify.

Thus, this tape gauge 94 provides a quick capsule indication of the where the tape head is currently positioned, relative to the current program, and relative to other programs or the tape, and the title of other programs.

The tape index screen 76 includes a tape motion indicator field 100. When the tape is undergoing high speed repositioning, the What's On This Tape (WOT) screen 76 will be displayed. During high speed search of a long program, the tape gauge 94 will appear to be dormant, since the gauge is relatively coarse for programs of long duration. To supplement the tape gauge 94, the tape indicator 100 is included. During high speed positioning, one of these messages will be displayed in the space above twin-hub tape icon 102: GO PLAY, GO RECORD, FORWARDING, REVERSING, PAUSE, and STOP.

GO PLAY is displayed while the tape is repositioning to the selected title. When the title is reached, the WOT screen 76 will be displaced by the playback video. GO RECORD is displayed while the tape is positioning to the selected program segment 98, where the new recording will be written.

Figure 18:
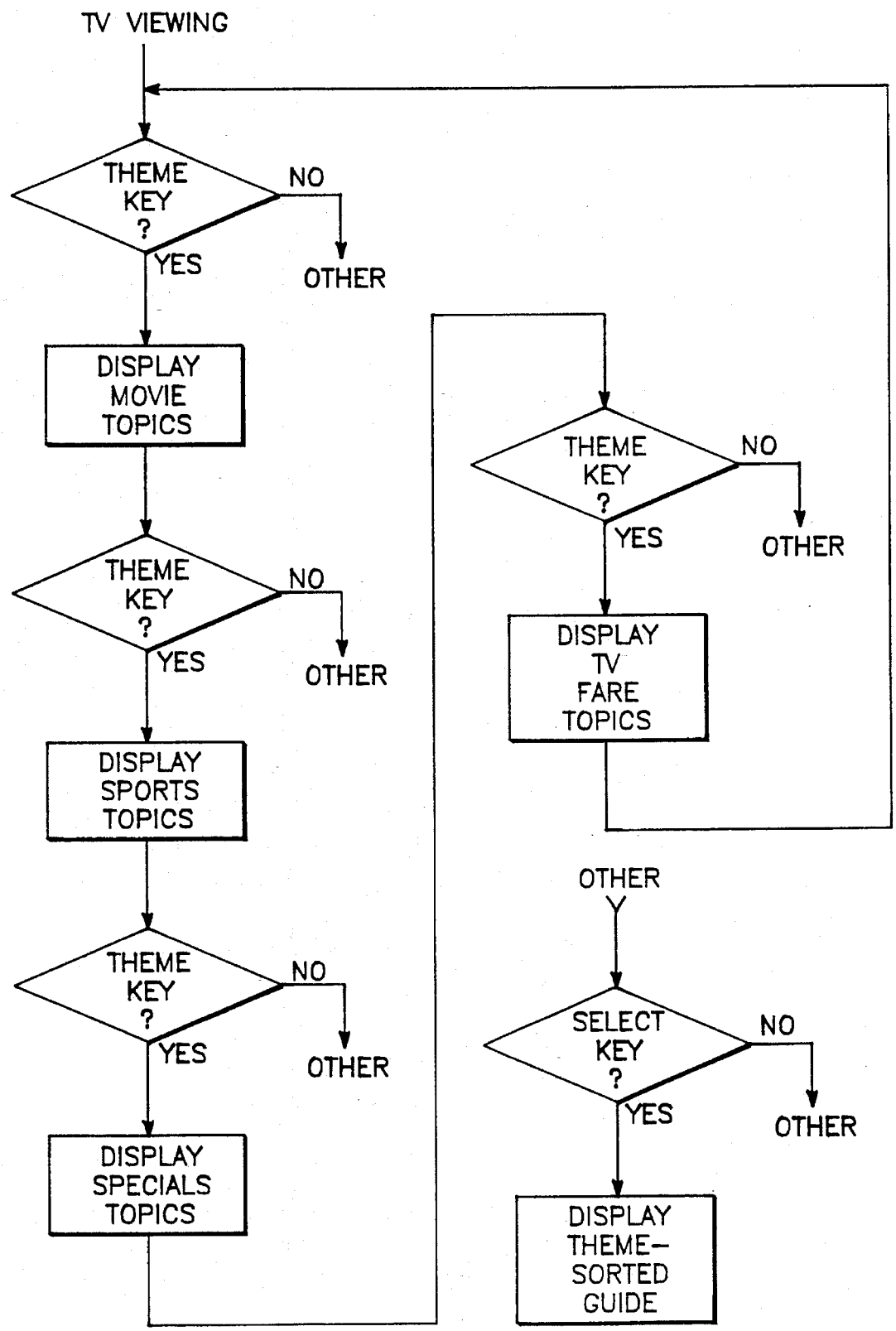
FIG. 18 is a flow chart for understanding operation of the FIGS. 14–18 diagrams.

FIGS. 14–17 show Theme function screens 104. The Theme function allows the viewer to quickly sort the downloaded schedule and display a subset schedule based on a subject of interest. The user has the freedom to select listings sorted first by major themes, second by topic(s) within a theme, and/or by topic qualifiers. All guides sorted by theme, topic and qualifier will be displayed in a row-tabulated format and begins by listing programs nearest to the current half-hour. The theme function screens 104 have the following attributes: Rotating Themes. There are four theme categories, with each theme title enclosed in horizontally-arranged selection boxes 106. From left to right, the themes are: [Movies] [Sports] [Specials] [TV Fare] FIG. 18 is a flow diagram defining the Theme command. Topic Selection. There are up to 16 topics 108 for each theme arranged in an 8 row by two column field 110. Any number of topics may be selected under a selected theme. Topics is a logical OR function, meaning that each listing that meets the definition of the topic will be displayed. For example under the theme of Movies, if the topic titles Comedy and Satire are selected, a subset schedule of both comedy movies and satire movies will be displayed.

Default All Selection

When the Theme screen 104 is first opened, the first slot (upper left most topic 108) will be highlighted. This is the ALL function, which is the sum of all topics 108 for the selected theme. The ALL function was created to minimize key stroking. Without an all topic category, the user must enable all 16 topics 108 individually. Conversely, if the user wishes to go from an all topics to an individual topic, the user must cursor to and deselect each of the other 15 topics.

Qualifiers

Each theme includes a group of search attributes or qualifiers 112. The qualifiers for each theme 106 are shown in the respective one of FIGS. 14–17 for each theme 106. Any number of qualifiers can be enabled at one time. These qualifiers perform a logical OR functions; they will select for display all listings (sorted first by theme and topic) that satisfy the qualifiers.

The qualifiers 112 are positioned for easy selection. The selection of qualifiers is made using the usual cursor commands. When a theme 106 is initially opened, by default, the cursor is located near the top of the screen. To minimize cursor commands, the qualifiers are also located near the top of the screen. In contrast, placing the qualifiers at the bottom of the screen would require a round trip of up to 16 key strokes.

The complete theme sorting strategy is defined as follows:
Listings=(Topic A+Topic B+etc.)*(Qualifier A+Qualifier b+etc.)

This may be read as listing all Topic A that also meets Qualifier A or Qualifier B, plus all Topic B that also meets Qualifier A or Qualifier B, etc.

Qualifiers, topics and themes are rooted in relational database operations and allow logical sorting of the schedule. To support these higher order of sorting, auxiliary data must be delivered to the VCR. In contrast, simple sorting operations, such as sorting by time and by channel are inherent in the fundamental information of a TV guide, and do not require auxiliary search data.

The keystroke sequence for using the themes screens 104 are as follows. While watching TV, the first Theme key command will summon the opening theme screen with the left most theme, Movies, highlighted. Further theme commands will rotate the theme selection from left to right. Each theme screen will be initialized to the ALL (topics) selection. If no topic selection is made, an all topics guide for the selected theme will be displayed upon depressing the Select/Goto command.

To additionally sort the theme by a single topic, position the cursor key to the desired topic and depress the Select/Goto key. Use the cursor to return to a topic.

To sort by more than one topic, position the cursor over each desired topic and depress the Select key. When finished, press Select/Goto to display a multiple-topic guide.

To sort by one or more attributes, position the cursor over each desired attribute and press the Select key. When finished, move the cursor to a topic and press Select/Goto to retrieve the theme/attribute-sorted TV guide.

Figure 19:
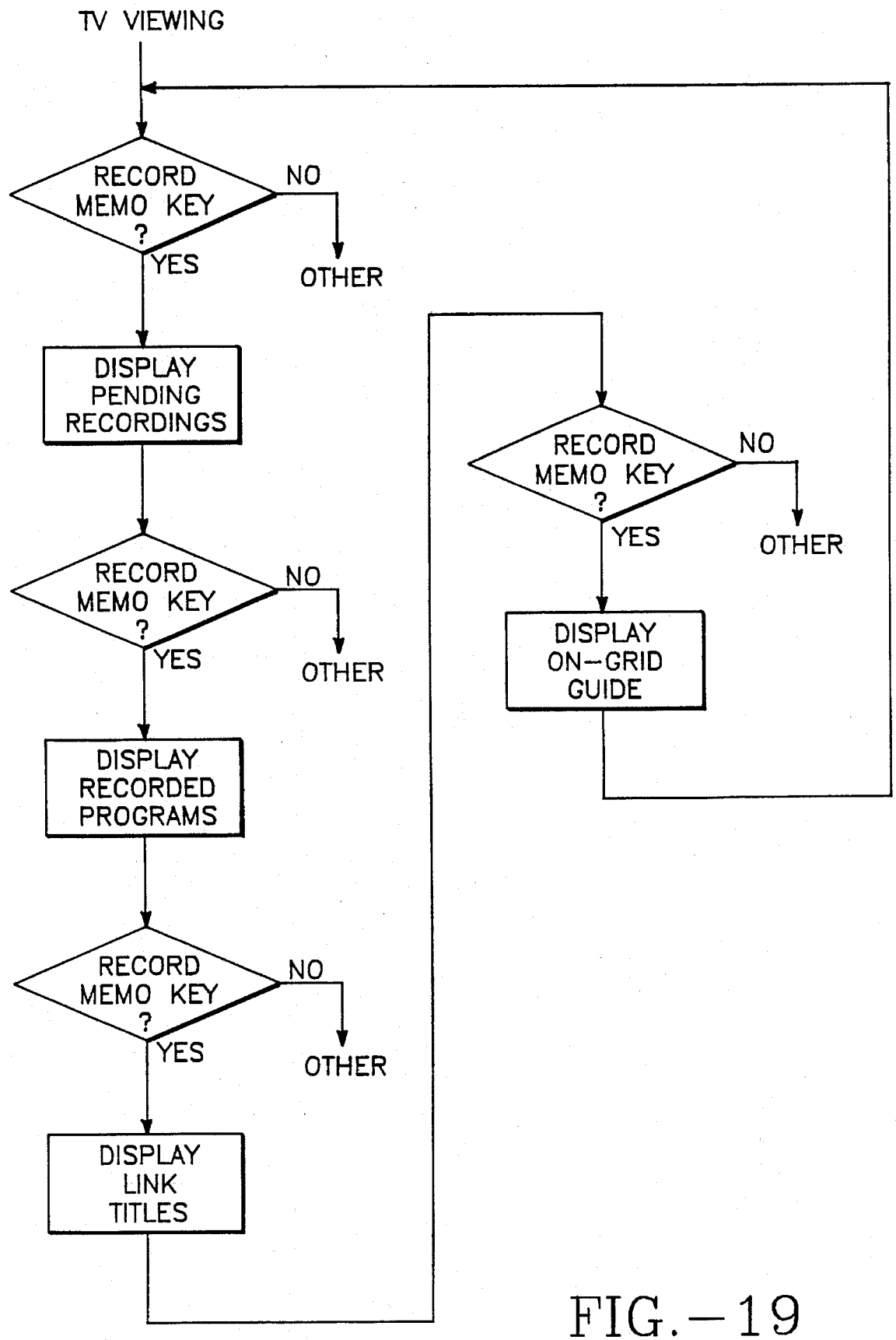
FIG. 19 is a flow chart for understanding operation of the FIG. 20 diagram.

Other than express recording, all recording activities are controlled with the Record Memo screen 16 of FIG. 4. The Record Memo screen 16 is accessed with a Record Memo key. When the Record Menu key is depressed, the following titles enclosed in horizontally-arranged selection boxes 114 will appear at the top of the opening screen. From left to right: [Pending [Recorded [Linked [On-Grid Recordings] Programs] Titles] Prog.] Each Record Memo key command will highlight a new selection, rotating from left to right, and wrapping around to Pending Recordings after the right most position. FIG. 19 is a flow diagram defining the Record Memo command.

FIG. 20 shows a Channel Customization screen 116. The screen 116 allows the user to customize channels to match viewing interest, providing a compact listing as well as eliminating undesired channels during up down scanning. During schedule update, a list of all cable channels available at the subscriber's cable system (or broadcast stations for over-the-air subscribers) is also delivered to the VCR. This unabridged set of channels may be customized using screen 116.

The channel customization screen 116 has two fields, a 3 column field 118 listing up to 36 unabridged channels and a single column field 120 listing 12 favorite MY channels. The latter is a replica of the channel descriptor column 122 (FIG. 1) of the opening grid guide. Additional pages are available (using the page key to swap between the pages) to accommodate systems with more than 36 channels. Each cell 124 in the 3 column field 118 contains the following information: Channel number and program service name (such as HBO or station KTVU, 2). The cell 124 is color-coded to indicate the following states: ON, default state before any customization, with the cell 124 in light green background. MY, favorite channels listed in the single column field 120, also shown in the three column field 118 with a blue background. OFF, a channel deleted from all guides, as well as during Channel Up/Dn scanning (still accessible using the ten key channel keypad). OFF cells have a gray background.

When first installed, the system assigns the first 12 (listed in numerical order) channels as MY favorites. The channel status may be changed by selecting a channel and picking a state, MY, ON, or OFF using the SELECT key.

Since only 12 favorites are allowed, the user must first remove a favorite channel by changing the status of an existing favorite channel to OFF or ON. When that is done, the first column will automatically open up a space for the next MY selection. When a new MY is selected, the MY column 120 will automatically insert the new selection in the prescribed order. The order of listing in the MY favorite channel column 120 is as follows:

All favorite broadcast stations will be listed first in numerical order. Next, all cable services will be listed in alphabetical order.

A new cable service, which displaces a previous service, will be inserted under the previous status. Example: If the channel was MY, the new service will be MY. However, a new cable service that appears on a new channel will be initialized ON.

Figure 21:
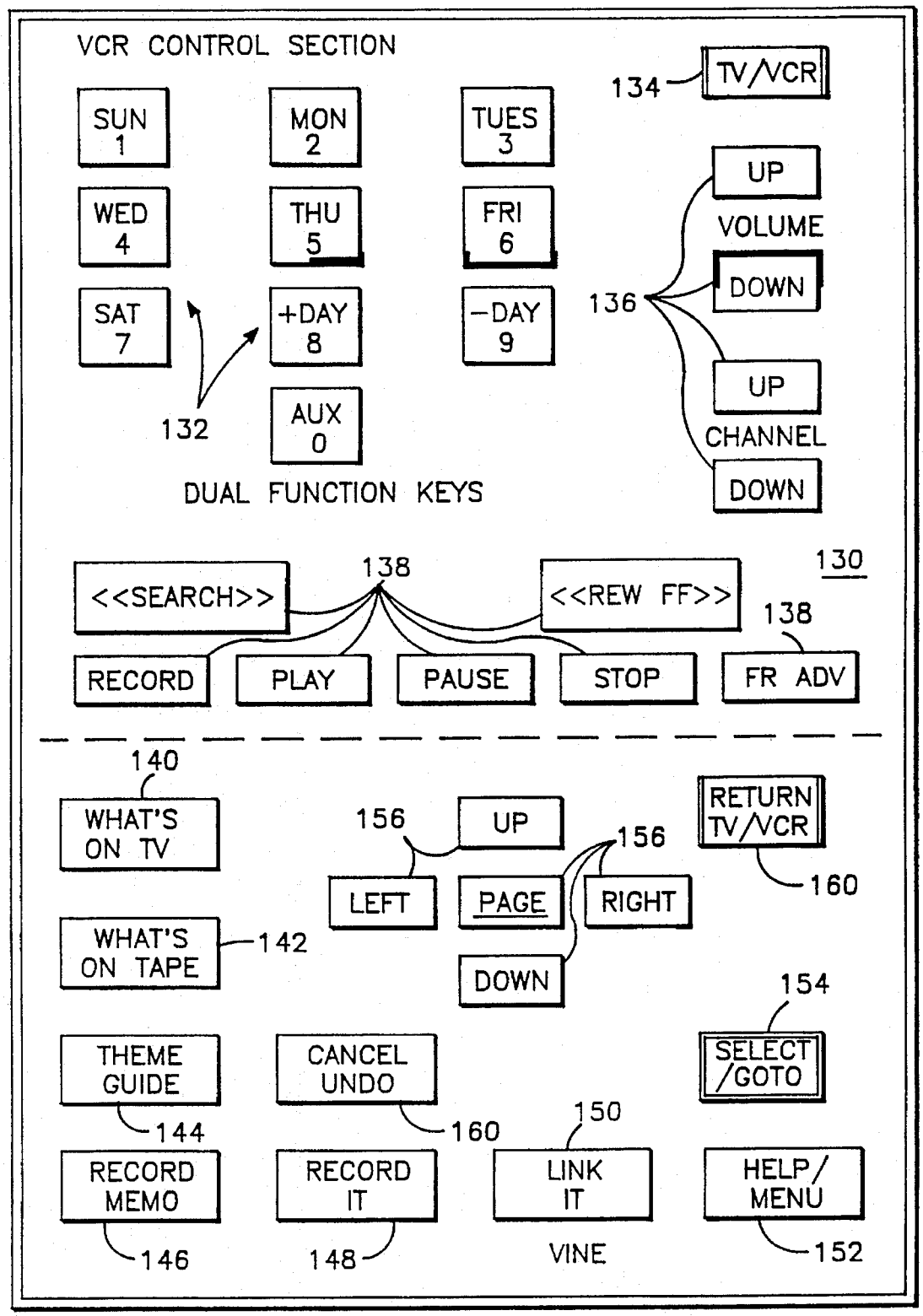
FIG. 21 is a diagrammatic plan view of a control panel for the system of the invention.

FIG. 21 shows a front panel 130 for a remote controller of the schedule system. The top half of the front panel 130 corresponds to a conventional remote controller for a television set and a VCR. Included are a dual function ten key keypad 132, with the alternate functions of each key and its digit shown, a TV/VCR toggle key 134, volume and channel up/down keys 136, and VCR control keys 138. The lower half of the front panel 130 contains control keys that are specific to the schedule system. Included are a What's On Tape key 140, a What's On TV key 142, a Theme key 144, a Record Memo key 146, a Record It key 148, a Link It key 150, a Help/Menu key 152, a Select/Goto key 154, Left, Right, Up, Down and Page Cursor keys 156, a Return TV/VCR key 158 and a Cancel/Undo key 160. The use of these keys has either been explained above or is apparent from their labels.

Figure 22B:
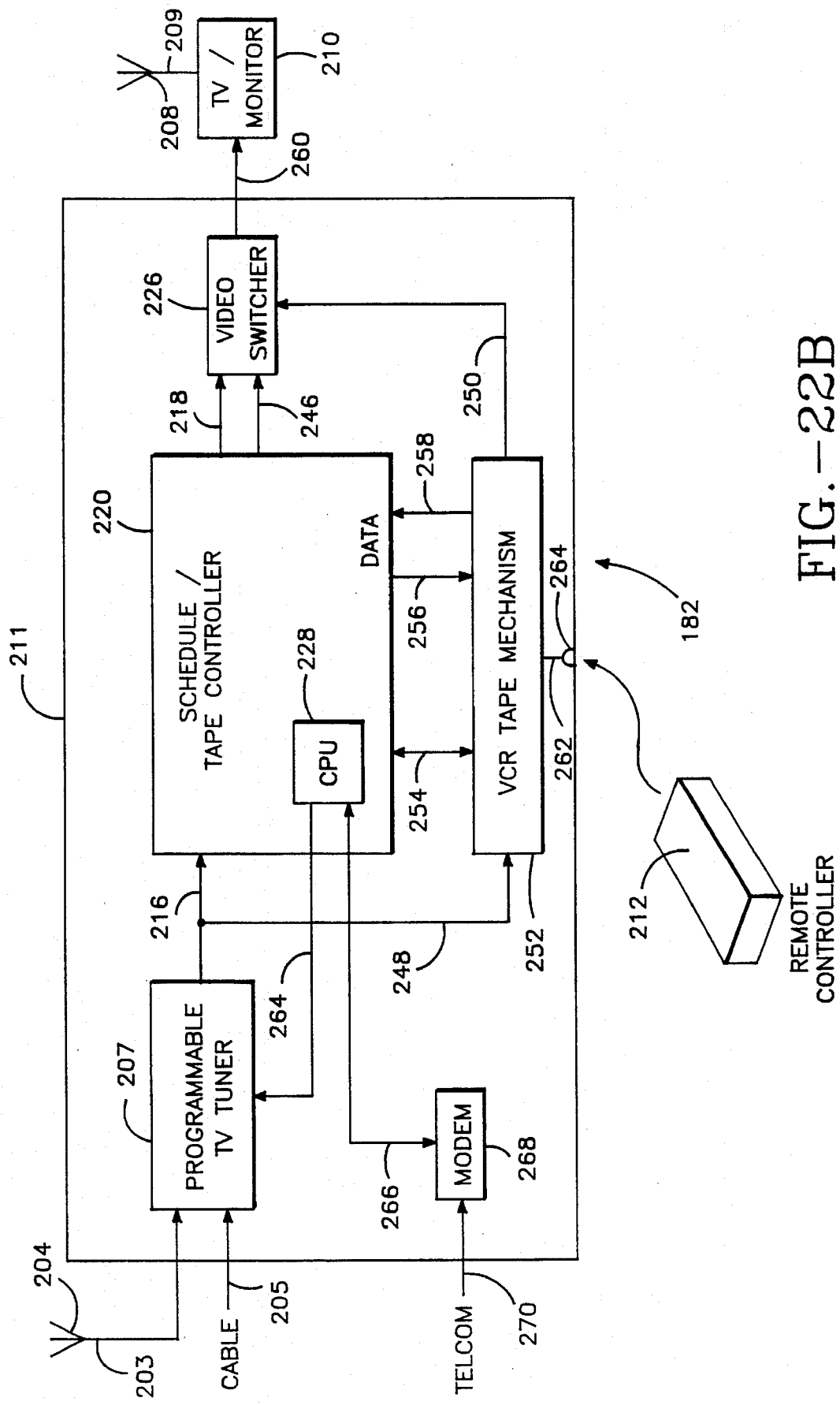
FIG. 22 is a block diagram of a television schedule system in accordance with the invention.

FIGS. 22A and 22B are block diagrams of television schedule systems/tape controllers 180 and 182 in which the user interface is used. The schedule system/controller 180 is applicable to existing television equipment, where the schedule system is separate from the basic television equipment. Programmable tuner 202 is shown as part of a cable decoder. The schedule system/controller 182 is shown as integrated into a VCR 211. In this version, a cable decoder is not required, and tuner 207 is part of the VCR 211. It should be clear from these two systems 180 and 182 that the schedule/tape controller may be integrated into other television equipment, such as a cable decoder or a TV/Monitor receiver. It is also practical to implement the entire schedule/tape controller in a remote controller by adding a text display, such as an LCD screen, on remote controller 212.

In the system 180, programmable tuner 202, which may be part of a cable decoder unit, receives a TV signal from antenna 200 and/or from cable input 205. Tuner output 216 goes to a vertical blanking interval (VBI) decoder 222, which may be a closed caption decoder or a high speed teletext decoder. Listing information and other support information, such as cable channel assignment data, will be transmitted over the VBI by one or more local stations or cable channels several times a day or continuously.

When update is required, programmable tuner 202 will be tuned automatically to the station or cable channel carrying the data. After the VBI signal is processed by CPU 228, the listing data is stored in schedule memory 232, while the cable channel assignment data is stored in cable-specific RAM memory 238. This data is used to convert generic TV source names, such as HBO, to channel assignments for the specific cable system.

Other information transmitted to the schedule/tape controller 180 and stored in the system RAM memory 240 includes clock update data to set system clock 230 automatically, schedule update time, which may vary from once a day to a continuously transmitted format, new theme categories, and last minute schedule change data.

For a What's on TV request, the listing stored in schedule memory 232 is retrieved, processed by CPU 228, and outputted to video display generator 224. Video switcher 226 is enabled by CPU output 246 to select the video display generator 224 output whenever schedule data is to be presented to the TV/monitor 210.

When a request to time-shift record a program is made, the title of the program and its record parameters (channel, start time and length) is copied from the schedule memory 232 to the Record Memo RAM memory 236. When the system clock 230 matches the schedule time, the CPU 228 will issue a channel command to the programmable tuner of the cable decoder 202, and a power on and record command to VCR 206 by means of an infrared remote driver 214 directed at infrared input ports of these two devices. In the VCR integrated version 182, the command to the tuner 207 is made on a wired bus 264.

In addition to programming by selecting a title from the on-screen schedule, it is also possible to program the VCR 206 or 211 and the cable decoder 202 or 207 with remote controller 212. In this mode, programming information is entered into the remote controller 212, and at the required time, the remote controller 212 will issue programming commands to the proper TV device. While there are many universal remote controllers that offer programming capability, none allow the user to enter generic names, such as station and cable channel names, and have the CPU convert the names to specific channels for tuning the VCR or the cable decoder. This is implemented by incorporating CPU 228 and the cable-specific RAM 238 in the remote controller 212.

Remote controller 212 and infrared remote driver 214 are capable of emulating the infrared command instructions required by the cable decoder 202 and VCR 206. The command emulation codes for the remote driver 214 are stored in cable decoder IFR code RAM/ROM memory 239. Commands for popular cable decoders and VCRs are preprogrammed in ROM. Alternatively, the infrared commands of the original remote controller may be learned by aiming the controllers at the IFR input receiver 264 and storing the command codes in RAM memory 239 after processing by CPU 228. This process is well known in the art of universal remote controllers and need not be detailed here.

As shown in FIG. 22A, the VCR 206 and cable decoder 202 may be manually controlled by remote controller 212, or it may be automatically controlled by infrared remote driver 214.

During recording, the tape index location of the VCR 206 will be transmitted over control/data bus 270 to the CPU 228. This start address information is stored in tape directory RAM memory 234, together with the program title. The bus 270 also carries VCR control commands for recording, playback, tuner selection, and other functions, including power on/off.

Once a program is recorded, its title and other program information is stored in a section of the Record Memo RAM memory 236. To play back a recorded program, the What's on Tape request will cause a directory of recorded programs on the tape to be displayed. When a program is selected for playback from this directory, the tape will fast forward or reverse to the tape index location specified in the Tape Directory RAM memory 234.

In the system 182, schedule/tape controller 220 is embedded in the VCR 211. The VCR tape mechanism 252 contains all the record and playback electronics of the video recorder, less the programmable tuner 207. Data recorded on the control track of a tape is coupled to the CPU 228 over input bus 258 and output bus 256. The art of recording data on the control track is well known, for example, in recent VCRs with indexing capability. CPU 228 commands to the VCR 211 are carried over bus 254. When schedule information is to be displayed, video switcher control input 246 selects the display generator on line 218. At other times, video switcher 226 selects the output of the VCR mechanism 252 on line 250.

Schedule information may be downloaded from the VBI. Alternatively or supplementally, it may be downloaded from a telecommunication line 270 to modem 268 and to CPU 228 via line 266. Other means of delivering schedule information can be employed, including the use of a subcarrier channel on the cable service.

It should now be readily apparent to those skilled in the art that a system and method incorporating a novel user interface capable of achieving the stated objects of the invention has been provided. The user interface that is configured to compensate for the particular nature of the television schedule information. The user interface has a cursor operation that compensates for an irregular grid format of the television schedule information. The user interface presents the schedule information in a format that compensates for limited resolution of the television display. The user interface presents supplemental schedule information in overlays that obscure a minimum amount of useful other information. Order of presentation of the schedule information in the interface is customizable by user preference.

It should further be apparent to those skilled in the art that various changes in form and details of the invention as shown and described may be made. It is intended that such changes be included within the spirit and scope of the claims appended hereto.

What is claimed is:

1. An interactive television schedule system, which comprises:

a television display, means coupled to said television display for displaying the television schedule on said television display as a grid of two-dimensionally arranged, adjacent irregular cells which vary in length corresponding to time duration of programs, with a title of a program being displayed in each of said irregular cells, said grid having a plurality of channels listed in a first dimension and time listed in a second dimension, user input means coupled to said means for displaying the television schedule, said user input means including a program selector and a movement control for a visual identification of ones of said irregular cells which initiates movement of said visual identification in the first dimension, and irregular movement of said visual identification in the second dimension in steps corresponding to variation in cell size, responsive to an input by a user to said movement control, between first and second ones of said irregular cells to select a desired one of said irregular cells corresponding to a desired program, a tuner coupled to said user input means for tuning to the desired program, and means coupled to said means for displaying the television schedule for displaying a program note overlay including a program description for the desired program on said television display.

2. The interactive television schedule system of claim 1 additionally comprising means coupled to said means for displaying the television schedule for selecting the desired visually identified program in response to activation of said program selector, and a receiver coupled to said means for selecting the desired program to tune said receiver to a select channel for the desired program.

3. The interactive television schedule system of claim 1 additionally comprising means coupled to said means for displaying the television schedule for selecting the desired visually identified program in response to activation of said program selector, and a recording device coupled to said means for selecting the desired program to record the desired program.

4. The interactive television schedule system of claim 1 in which said means for displaying the program note overlay is configured to display the program note overlay in different locations over said grid depending on a location of said visual identification on said grid to avoid masking said visual identification.

5. The interactive television schedule system of claim 4 in which said means for displaying the program note overlay is configured to display the program note overlay above said visual identification when said visual identification is near a bottom of said grid.

6. The interactive television schedule system of claim 4 in which said means for displaying the program note overlay is configured to display the program note overlay below said visual identification when said visual identification is near a top of said grid.

7. The interactive television schedule system of claim 1 in which said visual identification comprises a cursor.

8. An interactive television schedule system, which comprises: a television display, means coupled to said television display for displaying the television schedule on said television display as a grid of two-dimensionally arranged, adjacent irregular cells which vary in length corresponding to time duration of programs, with a title of a program being displayed in each of said irregular cells, said grid having a plurality of channels listed in a first dimension and time listed in a second dimension, user input means coupled to said means for displaying the television schedule, said user input means including a program selector and a movement control for a visual identification of ones of said irregular cells which initiates movement of said visual identification in the first dimension, and irregular movement of said visual identification in the second dimension in steps corresponding to variation in cell size, responsive to an input by a user to said movement control, between first and second ones of said irregular cells to select a desired one of said irregular cells corresponding to a desired program, means coupled to said means for displaying the television schedule for selecting the desired visually identified program in response to activation of said program selector, means coupled to said means for displaying the television schedule for displaying a program note overlay including a program description for the desired program on said television display, and a programmable tuner coupled to said means for selecting the desired program for tuning said programmable tuner to a selected channel for the desired program while the program note overlay is displayed on said television display.

9. The interactive television schedule system of claim 8 in which said visual identification comprises a cursor.

10. An interactive television schedule system, which comprises:

a television display, means coupled to said television display for displaying the television schedule on said display as a grid of two-dimensionally arranged, adjacent irregular cells which vary in length corresponding to time duration of programs, with a title of a program being displayed in each of said irregular cells, said grid having a plurality of channels listed in a first dimension and time listed in a second dimension, user input means coupled to said means for displaying the television schedule, said user input means including a program selector and a movement control for a visual identification of ones of said irregular cells which initiates movement of said visual identification in the first dimension, and irregular movement of said visual identification in the second dimension in steps corresponding to variation in cell size, responsive to an input by a user to said movement control, between first and second ones of said irregular cells to select a desired one of said irregular cells corresponding to a desired program, means coupled to said means for displaying the television schedule for selecting the desired visually identified program in response to activation of said program selector, means coupled to said means for displaying the television schedule for displaying a program note overlay including a program description for the desired program on said television display, a recording device coupled to said means for selecting the desired program for recording the desired program, and a tuner coupled to said program selector for tuning to the desired program while the program note overlay is displayed on said television display.

11. The interactive television schedule system of claim 10 in which said visual identification comprises a cursor.

* * * * *